(12) United States Patent
Prindle et al.

(10) Patent No.: US 11,347,471 B2
(45) Date of Patent: May 31, 2022

(54) INTERACTIVE PODCAST PLATFORM WITH INTEGRATED ADDITIONAL AUDIO/VISUAL CONTENT

(71) Applicant: GIIDE AUDIO, INC., Boulder, CO (US)

(72) Inventors: Scott Prindle, Boulder, CO (US); Allison Kent-Smith, Boulder, CO (US)

(73) Assignee: GIIDE AUDIO, INC., Boulder, CO (US)

( * ) Notice: Subject to any disclaimer, the term of this patent is extended or adjusted under 35 U.S.C. 154(b) by 0 days.

(21) Appl. No.: 16/808,059

(22) Filed: Mar. 3, 2020

(65) Prior Publication Data
US 2020/0285440 A1 Sep. 10, 2020

Related U.S. Application Data

(60) Provisional application No. 62/813,553, filed on Mar. 4, 2019.

(51) Int. Cl.
*G06F 3/16* (2006.01)
*G06F 16/438* (2019.01)
*G06F 16/955* (2019.01)

(52) U.S. Cl.
CPC ............ *G06F 3/165* (2013.01); *G06F 16/438* (2019.01); *G06F 16/9566* (2019.01)

(58) Field of Classification Search
CPC ..... G06F 3/165; G06F 16/9566; G06F 16/438
See application file for complete search history.

(56) References Cited

U.S. PATENT DOCUMENTS

| 9,858,277 | B2 * | 1/2018 | Jellison, Jr. .......... G11B 27/034 |
| 10,108,274 | B2 * | 10/2018 | Nicholls ................. G06F 3/048 |
| 2005/0060741 | A1 * | 3/2005 | Tsutsui ............... H04N 21/4722 |
| | | | 725/32 |

(Continued)

FOREIGN PATENT DOCUMENTS

KR 1020090123236 A 12/2009

OTHER PUBLICATIONS

Harry Guinness, "How to Listen to Spotify With Just Your Web Browser", published on May 28, 2018 to https://www.howtogeek.com/353342/how-to-listen-to-spotify-with-just-your-web-browser, retrieved on Oct. 7, 2020 (Year: 2018).*

(Continued)

*Primary Examiner* — Shourjo Dasgupta
(74) *Attorney, Agent, or Firm* — MLO, a professional corp.

(57) ABSTRACT

An interactive podcast with integrated additional audio/visual content. In one embodiment, a computing device comprising: an electronic processor; and a memory including an interactive podcast program that, when executed by the electronic processor, causes the electronic processor to perform a set of operations including retrieving, from a server, a podcast, one or more links to additional audio/visual content that is contextually related to the podcast, and metadata, and generating an interactive podcast by generating a plurality of graphical user interfaces based on the podcast, the one or more links to the additional audio/visual content, and the metadata. The plurality of graphical user interfaces is configured to provide a user interaction interface between the podcast and the one or more links to the additional audio/visual content.

3 Claims, 32 Drawing Sheets

(56) References Cited

U.S. PATENT DOCUMENTS

| | | | | |
|---|---|---|---|---|
| 2006/0190616 | A1 | 8/2006 | Mayerhofer et al. | |
| 2007/0112837 | A1* | 5/2007 | Houh | G06F 16/78 |
| 2007/0214485 | A1* | 9/2007 | Bodin | G06F 16/9577 725/101 |
| 2008/0031433 | A1* | 2/2008 | Sapp | H04M 3/56 379/92.03 |
| 2008/0183757 | A1* | 7/2008 | Dorogusker | G06Q 30/0241 |
| 2008/0255686 | A1* | 10/2008 | Irvin | G11B 27/329 700/94 |
| 2008/0256109 | A1* | 10/2008 | Irvin | G06F 16/64 |
| 2008/0313227 | A1* | 12/2008 | Shafton | G11B 27/105 |
| 2009/0144060 | A1 | 6/2009 | Groeger et al. | |
| 2009/0164904 | A1* | 6/2009 | Horowitz | G06F 16/78 715/723 |
| 2010/0279629 | A1* | 11/2010 | Srinivasan | H04H 20/62 455/74 |
| 2011/0055282 | A1* | 3/2011 | Hoving | G06F 16/958 707/802 |
| 2011/0126253 | A1* | 5/2011 | Roberts | H04N 21/4438 725/114 |
| 2012/0066592 | A1* | 3/2012 | Issa | G06F 3/0485 715/716 |
| 2013/0163948 | A1* | 6/2013 | Kano | H04N 5/775 386/230 |
| 2013/0290859 | A1* | 10/2013 | Venkitaraman | H04N 21/854 715/744 |
| 2013/0325601 | A1* | 12/2013 | Shekhawat | G06Q 30/0241 705/14.49 |
| 2014/0299873 | A1* | 10/2014 | Yamazaki | C23C 14/08 257/43 |
| 2015/0106441 | A1* | 4/2015 | Boulter | H04H 60/25 709/203 |
| 2015/0234821 | A1* | 8/2015 | Fenech | H04W 4/029 707/736 |
| 2015/0278352 | A1 | 10/2015 | Barrand | |
| 2015/0373428 | A1* | 12/2015 | Trollope | G06F 16/7844 704/235 |
| 2016/0142760 | A1* | 5/2016 | Son | H04N 21/47202 725/49 |
| 2016/0189713 | A1 | 6/2016 | Liu | |
| 2018/0061256 | A1* | 3/2018 | Elchik | G09B 7/06 |
| 2019/0182561 | A1* | 6/2019 | Garmark | H04N 21/439 |
| 2019/0200051 | A1* | 6/2019 | Paul | H04N 21/812 |
| 2019/0206399 | A1* | 7/2019 | Garmark | G06F 3/167 |
| 2020/0294487 | A1* | 9/2020 | Donohoe | G06F 3/167 |
| 2021/0084350 | A1* | 3/2021 | Chandra | H04N 21/8541 |

OTHER PUBLICATIONS

Nathan Hall, "Record and host audio online with SpeakPipe Voice Recorder", published online on Apr. 3, 2015 to https://nathanghall.wordpress.com/2015/04/03/record-and-host-audio-online-with-speakpipe-voice-recorder/, retrieved Jul. 1, 2021 (Year: 2015).*

"How to get feedback from your podcast listeners", published online on Jan. 25, 2017 to https://www.buzzsprout.com/blog/get-listener-feedback-on-podcast, retrieved Jul. 1, 2021 (Year: 2017).*

SpeakPipe website—main page, published online on Jan. 6, 2012 to https://www.speakpipe.com, retrieved Jul. 1, 2021 (Year: 2012).*

SpeakPipe website—frequently asked questions, published online on Jan. 6, 2012 to https://www.speakpipe.com/faq, retrieved Jul. 1, 2021 (Year: 2012).*

"Interactive podcasting app, Entale, launches out of beta, with new shows including I'm Absolutely Fine by the Midult", published on Oct. 4, 2018 to https://podnews.net/press-release/entale-out-of-beta, retrieved Jan. 12, 2022. (Year: 2018).*

International Search Report and Written Opinion for Application No. PCT/US2020/020815 dated Jul. 1, 2020 (9 pages).

* cited by examiner

FIG. 23

INTERACTIVE PODCAST PLATFORM WITH INTEGRATED ADDITIONAL AUDIO/VISUAL CONTENT

CROSS-REFERENCE TO RELATED APPLICATION

This application claims priority to and benefit of U.S. Provisional Application No. 62/813,553, filed on Mar. 4, 2019, the entire content of which is incorporated herein by reference.

FIELD

The present disclosure relates generally to interactive content. More specifically, the present disclosure relates to an interactive podcast platform with integrated additional audio/visual content that is contextually related to a specific podcast.

SUMMARY

In embodiments of the present disclosure, the interactive podcast platform is a software platform for a creator/expert to create an interactive "podcast" and deliver that podcast to end users. The platform includes various interactive features relative to the underlying podcast to create an "interactive podcast."

Also in embodiments of the present disclosure, the interactive podcast is an audio-centric, audio-guided, expert-curated, audio/visual learning experience, within a mobile application, a web module, or embeddable media player, that guides a user through a series of curated third-party links, resources, articles, videos, educational instructions, or other suitable information. The user interface design is rooted in a conventional media player design, with play/pause, rewind, and fast forward controls. However, unlike conventional media player designs, the interactive graphical user interfaces described herein are enhanced with various interactive features as described in greater detail below. For example, one interactive feature is a graphical user interface element embedded in the podcast graphical user interface that links the podcast to contextually-related third-party content based on the content of the podcast. Additionally, for example, another interactive features is a graphical user interface element embedded in the podcast graphical user interface that links the podcast to two-way interaction such as a question that is asked of the listener or an advertisement or call to action on the screen that the listener can interact with while listening the podcast audio.

One example embodiment of the present disclosure includes a computing device including an electronic processor and a memory. The memory includes an interactive podcast program that, when executed by the electronic processor, causes the electronic processor to perform a set of operations. The set of operations includes retrieving, from a server, a podcast, one or more links to additional audio/visual content that is contextually related to the podcast, and metadata. The set of operations also includes generating an interactive podcast by generating a plurality of graphical user interfaces based on the podcast, the one or more links to the additional audio/visual content, and the metadata. The plurality of graphical user interfaces is configured to provide a user interaction interface between the podcast and the one or more links to the additional audio/visual content.

Another example embodiment of the present disclosure includes a non-transitory computer-readable medium storing instructions that, when executed by an electronic processor, cause the electronic processor to perform a set of operations. The set of operations includes retrieving, from a server, a podcast, one or more links to additional audio/visual content that is contextually related to the podcast, and metadata. The set of operations also includes generating an interactive podcast by generating a plurality of graphical user interfaces based on the podcast, the one or more links to the additional audio/visual content, and the metadata. The plurality of graphical user interfaces is configured to provide a user interaction interface between the podcast and the one or more links to the additional audio/visual content.

Yet another example embodiment of the present disclosure includes a method for authoring an interactive podcast. The method includes recording, with an electronic processor, audio. The method includes converting, with the electronic processor, the audio into textual information. The method includes dividing, with the electronic processor, the audio into segments. The method includes creating, with the electronic processor, an interactive podcast by uploading additional material that is then linked to one or more timestamps in the audio. The method also includes uploading, with the electronic processor, the interactive podcast to a server.

BRIEF DESCRIPTION OF THE DRAWINGS

FIGS. 15-25 are graphical user interfaces that illustrate one example of the content authoring toolkit of FIG. 6.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
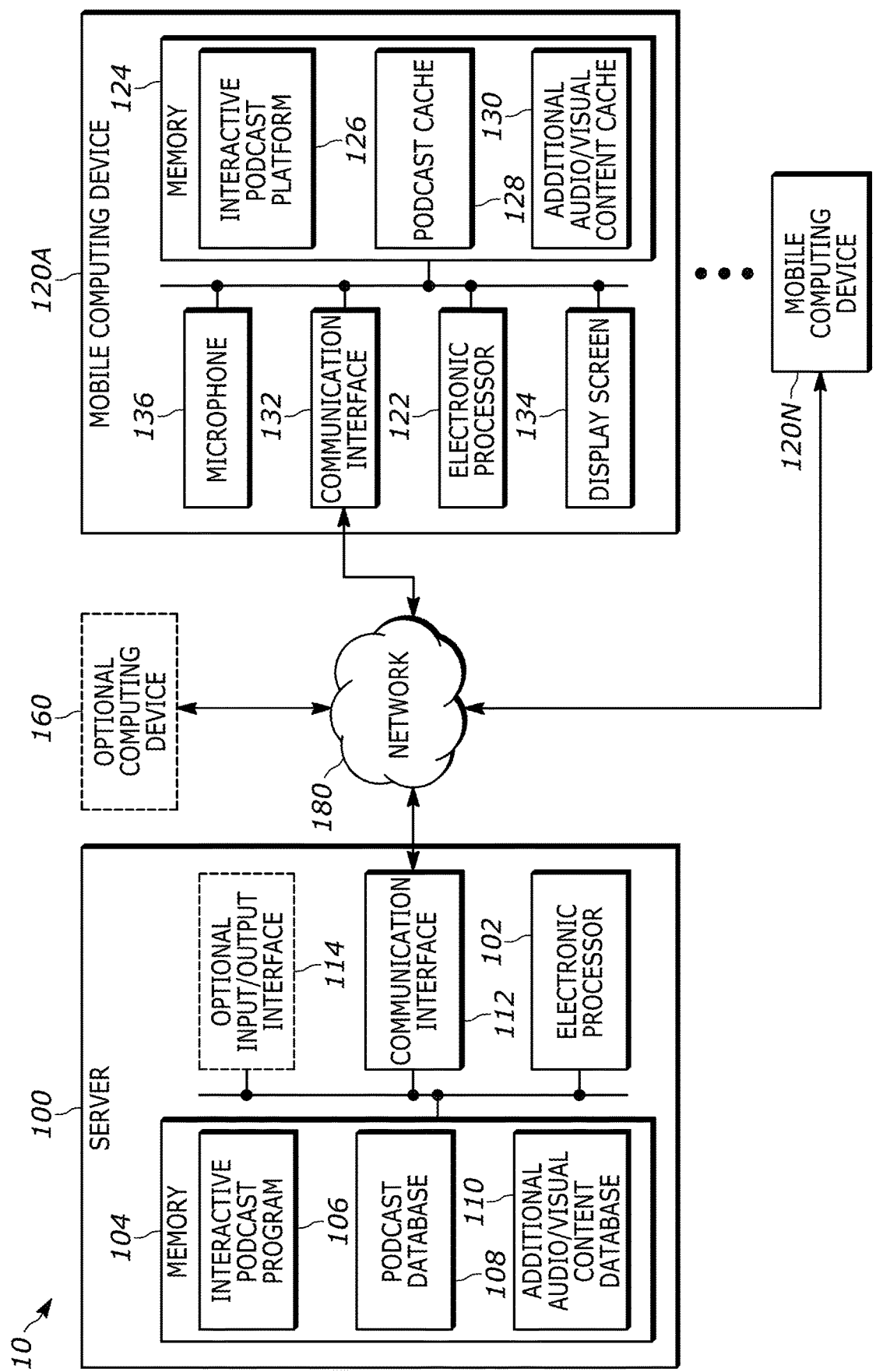
FIG. 1 is a block diagram illustrating a system providing an interactive podcast platform with integrated additional audio/visual content that is contextually related to a specific podcast.

FIG. 1 is a block diagram illustrating a system 10 providing an interactive podcast platform with integrated additional audio/visual content that is contextually related to a specific podcast. It should be understood that, in some embodiments, there are different configurations from the configuration illustrated in FIG. 1.

In the example of FIG. 1, the system 10 includes a server 100, a plurality of mobile computing devices 120A-120N, an optional computing device 160, and a network 180. The server 100 includes an electronic processor 102 (for example, a microprocessor or another suitable processing device), a memory 104 (for example, a non-transitory computer-readable storage medium), a communication interface 112, and an input/output interface 114. It should be understood that, in some embodiments, the server 100 may include fewer or additional components in configurations different from that illustrated in FIG. 1. Also, the server 100 may perform additional functionality than the functionality described herein. In addition, the functionality of the server 100 may be incorporated into other servers. As illustrated in FIG. 1, the electronic processor 102, the memory 104, the communication interface 112, and input/output interface 114 are electrically coupled by one or more control or data buses enabling communication between the components.

The electronic processor 102 executes machine-readable instructions stored in the memory 104. For example, the electronic processor 102 may execute instructions stored in the memory 104 to perform the functionality described herein.

The memory 104 may include a program storage area (for example, read only memory (ROM)) and a data storage area (for example, random access memory (RAM), and other non-transitory, machine-readable medium). In some examples, the program storage area may store machine-executable instructions regarding an interactive podcast program 106 (e.g., an application programming interface (API)). In some examples, the data storage area may store data regarding a podcast database 108 and an additional audio/visual content database 110.

In some examples, the podcast database 108 is a database storing various podcasts that have been uploaded for retrieval by any one of the plurality of mobile computing devices 120A-102N via the interactive podcast program 106. Similarly, in some examples, the additional audio/visual content database 110 is a database storing, among other things, links to various third-party audio/visual content or links to various author-created audio/visual content that is contextually related to one or more podcasts in the podcast database 108, and has been uploaded for retrieval by any one of the plurality of mobile computing devices 120A-102N via the interactive podcast program 106. Additionally, in some examples, the additional audio/visual content database 110 may further include audio notes (as described in greater detail below) and other open source information that is contextually-related to one or more podcasts in the podcast database 108.

The links to various third-party audio visual content may include a third-party hyperlink, a third-party document, a third-party image, a third-party highlight, a third-party quote, a third-party audio, a third-party quiz, a third-party video, or a combination thereof. The links to various author-created audio/visual content may include an author-created hyperlink, an author-created document, an author-created image, an author-created highlight, an author-created quote, an author-created audio, an author-created quiz, an author-created video, or a combination thereof.

The term "audio/visual content" is defined as content that includes audio content, visual content, or a combination of audio and visual content. When the "audio/visual content" includes visual content, then the interactive podcast is "multimodal" in the sense that a user is experiencing the podcast audio content in combination with visual content to render a multimodal experience.

In some examples, the electronic processor 102, when executing the interactive podcast program 106, retrieves a specific podcast from the podcast database 108 along with links to the contextually-related content from the additional audio/visual content database 110, and integrates the specific podcast and the links to the contextually-related content together into the "interactive podcast" as described herein. Additionally, in some examples, when executing the interactive podcast program 106, the server 100 may receive user input, provide user output, or both by communicating with an external device (e.g., the mobile computing device 120A) over a wired or wireless connection. For example, the graphical user interfaces of the interactive podcast platform application 126 as described herein may instead be graphical user interfaces generated by the interactive podcast program 106 (e.g., a website hosted by the server 100) and receive inputs from mobile computing device 120A via the network 180. In some examples, the interactive podcast platform application 126 includes a mobile app, a web module, an embedded audio player, or a combination thereof.

The communication interface 112 receives data from and provides data to devices external to the server 100, such as the mobile computing device 120A via the network 180. For example, the communication interface 112 may include a port or connection for receiving a wired connection (for example, an Ethernet cable, fiber optic cable, a telephone cable, or the like), a wireless transceiver, or a combination thereof. In some examples, the network 180 is the Internet.

The optional input/output interface 114 receives inputs from one or more input mechanisms (for example, a touch screen, a keypad, a button, a knob, and the like) and provides outputs to one or more output mechanisms (for example, a speaker, and the like), or a combination thereof. The optional input/output interface 114 may receive input from an administrative user, provide output to an administrative user, or a combination thereof.

For ease of understanding, description of the plurality of mobile computing devices 120A-120N is limited to a mobile device 120A. However, the description of the mobile device 120A is equally applicable to the other mobile computing devices in the plurality of mobile computing devices 120A-120N.

Additionally, for ease of understanding, description of the plurality of mobile computing devices 120A-120N is limited to a mobile device 120 instead of a plurality of computing devices 120A-120N including a computing device 120A. However, the description of the plurality of mobile computing devices 120A-120N and the mobile device 120A is equally applicable to the other "non-mobile" computing devices, for example, a desktop computer device as the optional computing device 160 that implements a web module or embeddable interactive, multimodal player. Therefore, while the mobile computing device 120A may be a smartphone, the description with respect to the mobile computing device 120A may also be applied to a desktop computer as the optional computing device 160.

In the example of FIG. 1, the mobile computing device 120A includes an electronic processor 122 (for example, a microprocessor or another suitable processing device), a memory 124 (for example, a non-transitory computer-readable storage medium), a communication interface 132, a display screen 134, and a microphone 136. It should be understood that, in some embodiments, the mobile computing device 120A may include fewer or additional components in configurations different from that illustrated in FIG. 1. Also, the mobile computing device 120A may perform additional functionality than the functionality described herein. In addition, some of the functionality of the mobile computing device 120A may be incorporated into other devices (e.g., incorporated into the interactive podcast program 106 of the server 100). As illustrated in FIG. 1, the electronic processor 122, the memory 124, the communication interface 132, the display screen 134, and the microphone are electrically coupled by one or more control or data buses enabling communication between the components.

The electronic processor 122 executes machine-readable instructions stored in the memory 124. For example, the electronic processor 122 may execute instructions stored in the memory 124 to perform the functionality described herein.

The memory 124 may include a program storage area (for example, read only memory (ROM)) and a data storage area (for example, random access memory (RAM), and other non-transitory, machine-readable medium). The program storage area includes an interactive podcast platform application 126. In some examples, the interactive podcast platform application 126 may be a standalone application. In other examples, the interactive podcast platform application 126 is a feature that is part of a separate application. The data storage area includes a podcast cache 128 and an additional audio/visual content cache 130.

The interactive podcast platform application 126 generates various graphical user interfaces to provide different interactive features with a specific podcast and audio/visual content that is contextually related to the podcast. Additionally, the interactive podcast platform application 126 generates various graphical user interfaces to provide a content creating toolkit feature for creating an interactive podcast with one or more links to the audio/visual content that are contextually related to a specific podcast.

In some examples, the podcast cache 128 stores various podcasts that have been downloaded from the server 100 via the interactive podcast program 106. Similarly, in some examples, the additional audio/visual content cache 130 stores, among other things, various links to content that is contextually related to one or more podcasts in the podcast cache 128, and has been downloaded from the server 100 via the interactive podcast program 106. In some examples, the electronic processor 122, when executing the interactive podcast platform application 126, retrieves a specific podcast from the podcast cache 128 (or the podcast database 108) along with the links to the contextually-related content from the additional audio/visual content cache 130 (or the additional audio/visual content database 110), and integrates the specific podcast and the links to the contextually-related content together into the "interactive podcast" as described herein.

In some examples, the mobile computing device 120A is a smartphone or other suitable computing device that includes a presence-sensitive display screen. In other examples, the mobile computing device 120A is a laptop, a desktop computer, or other suitable computing device that includes or is connected to an input mechanism. In these examples, the user may select one of the graphical elements corresponding to the integrated additional audio/visual content that is contextually related to the specific podcast via the presence-sensitive display screen or the input device. Upon selecting the graphical element, the user is able to "interact" and "drill down" into specific information regarding the selected additional audio/visual content.

In some examples, the mobile computing device 120A includes one or more user interfaces (not shown). The one or more user interfaces include one or more input mechanisms (for example, a touch screen, a keypad, a button, a knob, and the like), one or more output mechanisms (for example, a speaker, and the like), or a combination thereof. The one or more optional user interfaces receive input from a user, provide output to a user, or a combination thereof. In some embodiments, as an alternative to or in addition to managing inputs and outputs through the one or more optional user interfaces, the mobile computing device 120A may receive user input, provide user output, or both by communicating with an external device (e.g., the server 100) over a wired or wireless connection.

The communication interface 132 receives data from and provides data to devices external to the mobile computing device 120A, e.g., the server 100. For example, the communication interface 132 may include a port or connection for receiving a wired communication link (for example, an Ethernet cable, fiber optic cable, a telephone cable, or the like), a wireless transceiver for receiving a wireless communication link, or a combination thereof.

The display screen 134 is an array of pixels that generates and outputs images including the graphical user interface as described herein to a user. In some examples, the display screen 136 is one of a liquid crystal display (LCD) screen, a light-emitting diode (LED) and liquid crystal display (LCD) screen, a quantum dot light-emitting diode (QLED) display screen, an interferometric modulator display (IMOD) screen, a micro light-emitting diode display screen (mLED), a virtual retinal display screen, or other suitable display screen. The electronic processor 122 controls the display screen 136 to display the graphical user interfaces as described herein when executing the interactive podcast platform application 126.

The microphone 136 includes an audio sensor that generates and outputs audio data. The electronic processor 122 receives the audio data that is output by the microphone 136 and stores the audio as part of a podcast in the podcast cache 128 before being uploaded to the podcast database 108.

Figure 2:
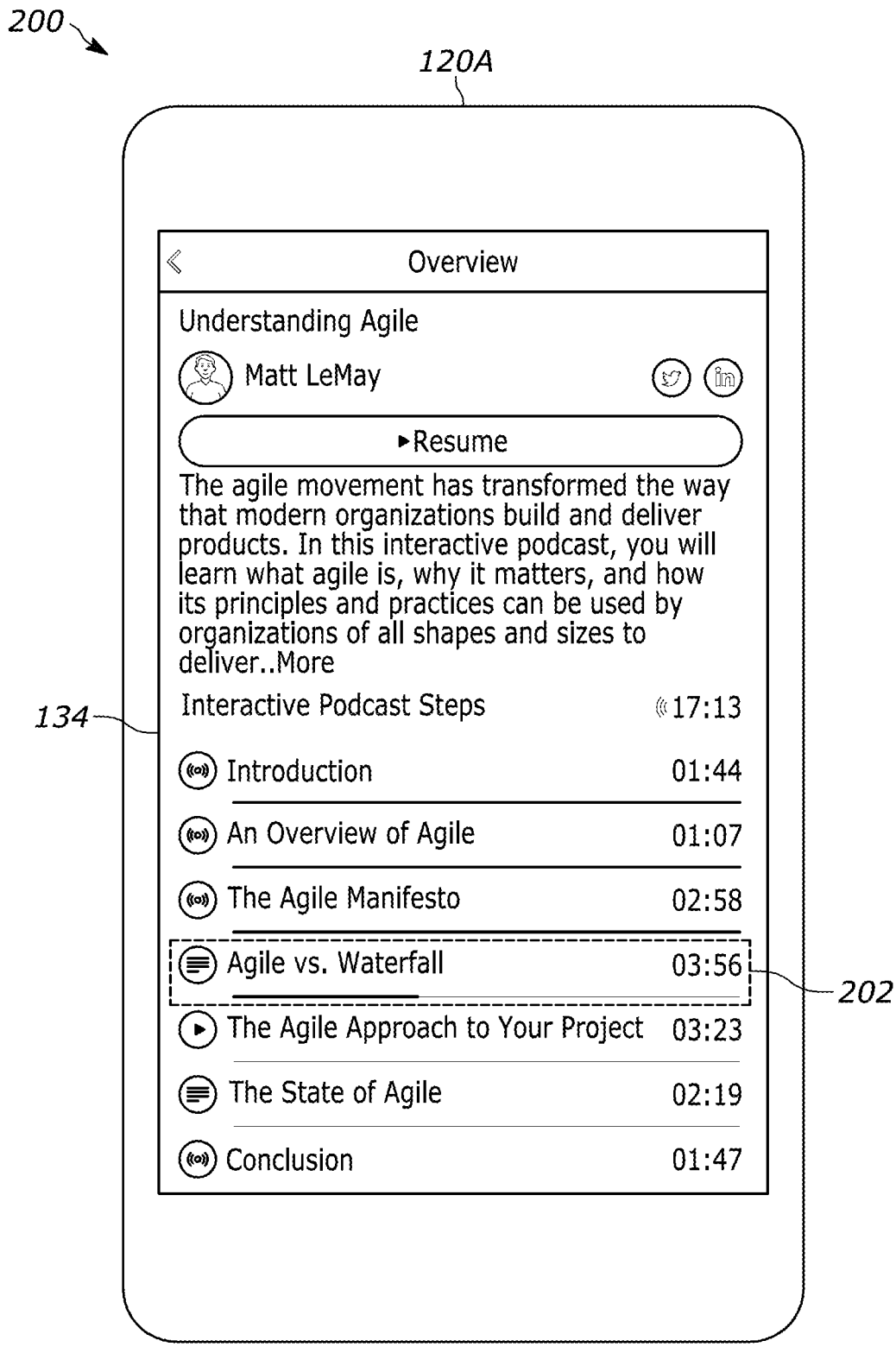
FIG. 2 is an image illustrating a first example graphical user interface that includes different segments in the specific podcast.
Figure 3:
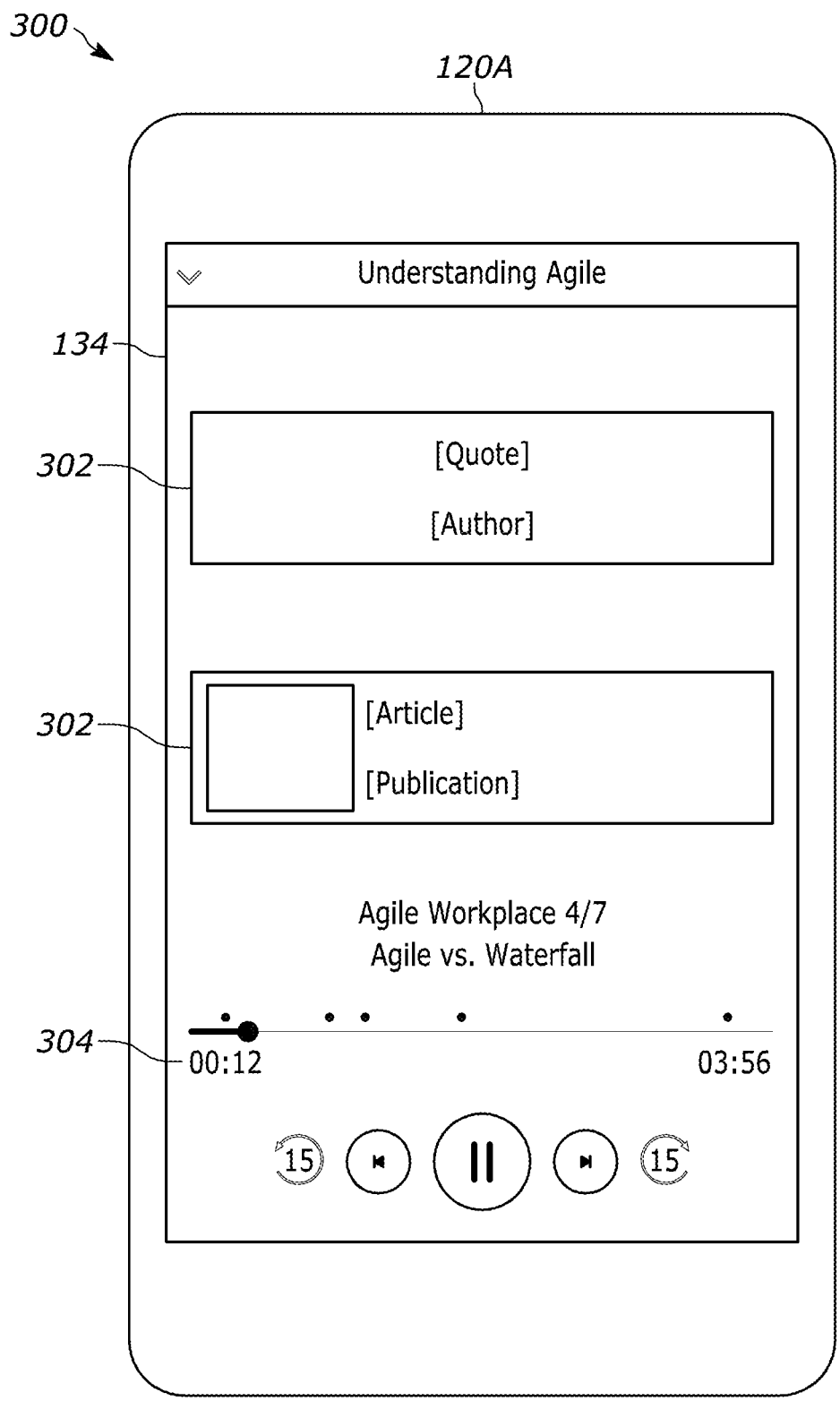
FIG. 3 is an image illustrating a second example graphical user interface that includes a graphical user interface element for accessing integrated additional audio/visual content that is contextually related to the specific podcast.

FIG. 2 is an image illustrating a first example graphical user interface 200 that includes different segments in the specific podcast. As illustrated in FIG. 2, the selection of the chapter 202 by a user causes the mobile device 120A to transition to another graphical user interface. For example, FIG. 3 is an image illustrating a second example graphical user interface 300 that includes a graphical user interface element 302 for accessing integrated additional audio/visual content that is contextually related to the specific podcast. The graphical user interface element 302 may be referred to as "feed cards" that are interactive and link out to the resource, bookmark, or share that piece of content on the display of the mobile computing device 120A.

As explained above, unlike the conventional media player design, the interactive graphical user interfaces described herein is enhanced with the graphical user interface element 302 that links to contextually-related third-party content based on the content and step the user experiences within the interactive podcast. This element 302, on initial content load, is de-activated. In the course of the audio overview, as soon as the expert references the third-party content, the button activates. As illustrated in FIG. 3, at the one minute and five seconds mark highlight by box 304, the element 302 is activated for access by the user.

In some examples, the element 302 may be a static element that links to only one piece of audio/visual content. In other examples, the element 302 may be a dynamic element that updates over the course of the audio overview to link to more than one piece of audio/visual content.

Figure 4:
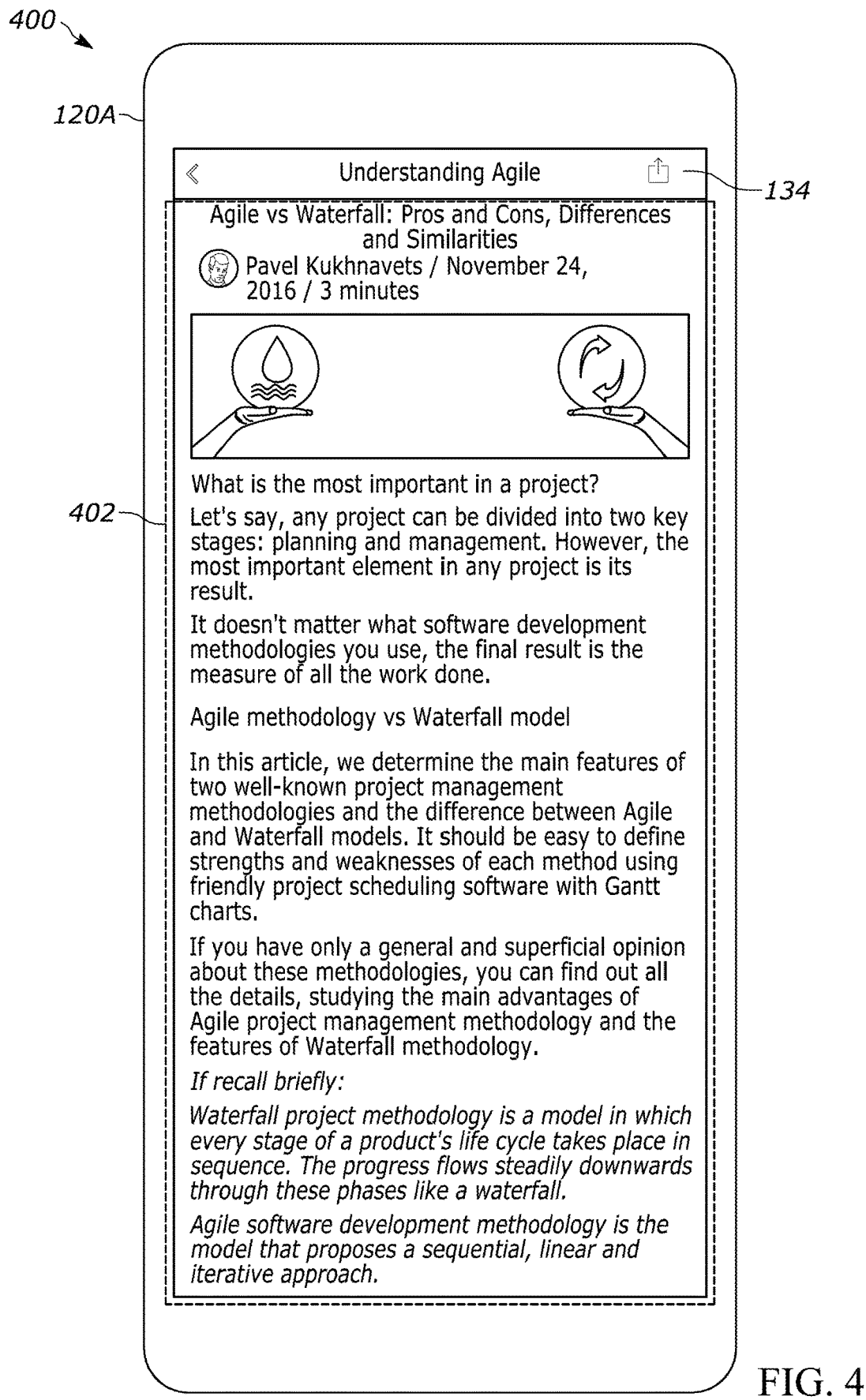
FIG. 4 is an image illustrating a third example graphical user interface that displays one example of the integrated additional audio/visual content that is contextually related to the specific podcast.

The user taps the element 302, which pauses the audio and launches the third-party link in a modal window, allowing the user to read, view, or listen to the additional audio/visual content that is contextually related to the podcast. FIG. 4 is an image illustrating a third example graphical user interface 400 that displays one example of the integrated additional audio/visual content 402 that is contextually related to the specific podcast. Closing the third example graphical user interface 400 returns the user to the second graphical user interface 300 and restarts the audio play where the user left off. Curating external links into a primary listening interaction may occur in some or all of the segments of the podcast. For example, the segments may be chapters, steps, other suitable segments, or a combination thereof.

Figure 5:
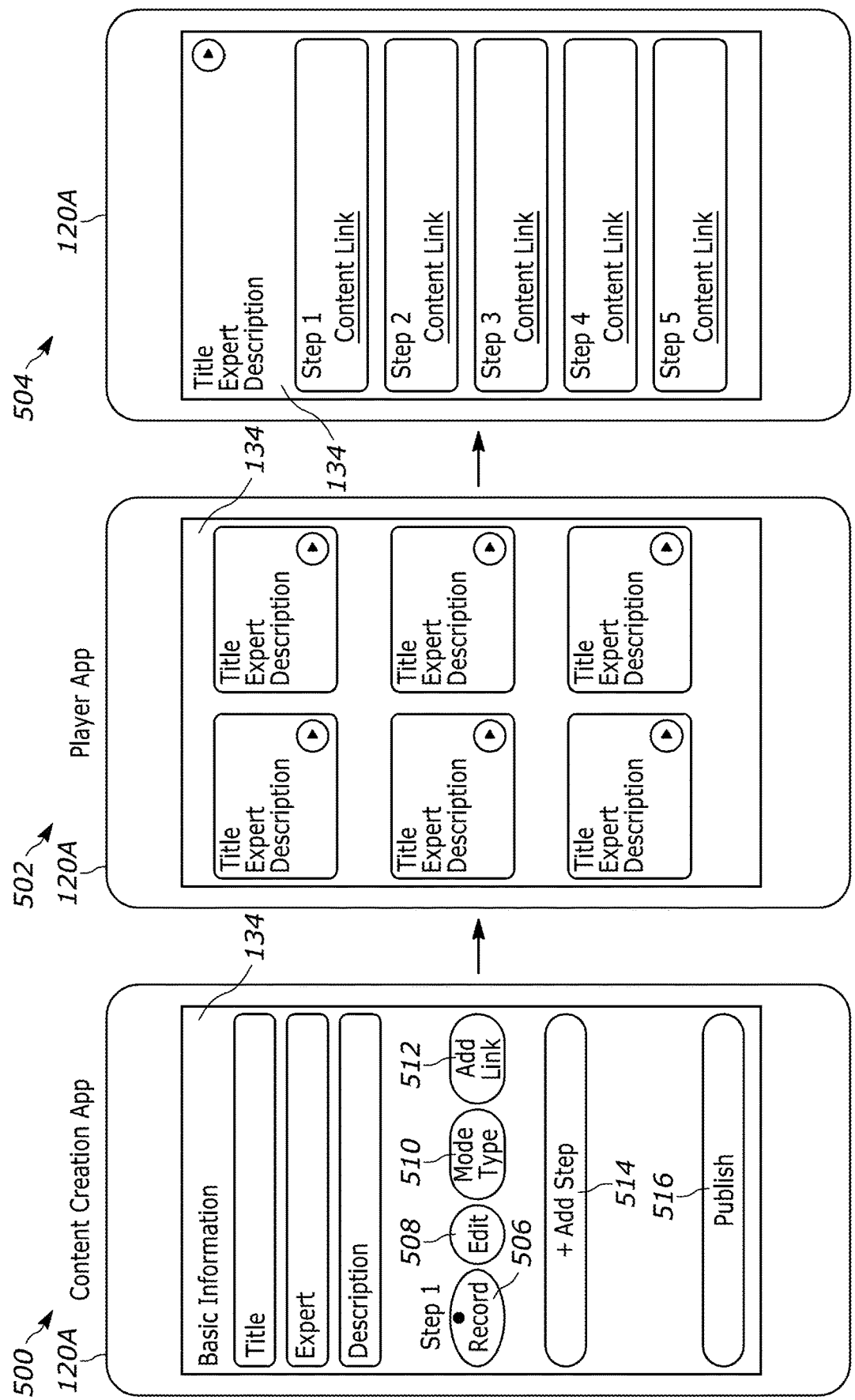
FIG. 5 is an image illustrating transitions between a fourth example graphical user interface, a fifth example graphical user interface, and a sixth example graphical user interface as part of the content creating toolkit feature in the interactive podcast platform of FIG. 1.

FIG. 5 is an image illustrating transitions between a fourth example graphical user interface 500, a fifth example graphical user interface 502, and a sixth example graphical user interface 506 as part of the content creating toolkit feature in the interactive podcast platform of FIG. 1.

The web and mobile-based content creation toolkit provided by the graphical user interfaces 500-504 guide the content creator (e.g., a teacher or a client) through the process of creating content for both audio-only and audio/visual modes. As illustrated in FIG. 5, the fourth example graphical user interface 500 is a content creation graphical user interface that includes a title field, an expert name field, and a description field along with a record button 506, an edit button 508, a mode type button 510, an add link button 512, an add step button 514, a publish button 516.

The fourth example graphical user interface 500 prompts for audio recordings of teaching scenarios that acknowledge the learner's learning mode—either audio/visual, or audio-only. The fourth example graphical user interface 500 in combination with the microphone 136 of the mobile computing device 120A may record audio files. The fourth example graphical user interface 500 may also link to a custom audio editing tool, library of audio assets, a form to upload links to third party images and videos, and a preview mode.

As illustrated in FIG. 5, a user may record audio with the record button 506. The user may edit a podcast chapter with the edit button 508. The user may select a particular mode of the podcast chapter with the mode type button 510. The user may add a link to additional content with the add link button 512 (e.g., third party content or user generated content including documents, images, highlights, quizzes, or other suitable content). The user may add another podcast chapter by selecting the add step button 514. Lastly, the user may save the interactive podcast by selecting the publish button 516. The finished "interactive podcast" is then uploaded to the server 100 to be provided to and consumed by end users on their mobile devices. In some examples, the audio portion of the interactive podcast is stored in the podcast database 108 and the links to the contextually-related third-party content are stored in the database 110.

Additionally, in some examples, a content creator may continually update a given podcast with relevant and up-to-date content. When the content creator finds a new article that is related to a particular topic in the podcast, the content creator may use the fourth example graphical user interface 500 to link the new article.

For example, through the fourth example graphical user interface 500, the content creator may add the new link with the new link button 512, add an accompanying 30-second audio preview to the link with the record button 506, and tap "save" with the publish button 516. Upon saving, the mobile computing device 120A appends the new content to the existing content by uploading the new content to the additional audio/visual content database 110 from the additional audio/visual content cache 130. In some examples, the mobile computing device 120A may also control the server 100 to transmit an in-app message to any users who have listened to the updated interactive podcast, letting the users know that new content is available. The user taps a link in the notification and is taken directly to the new content in the interactive podcast platform application.

Figure 6:
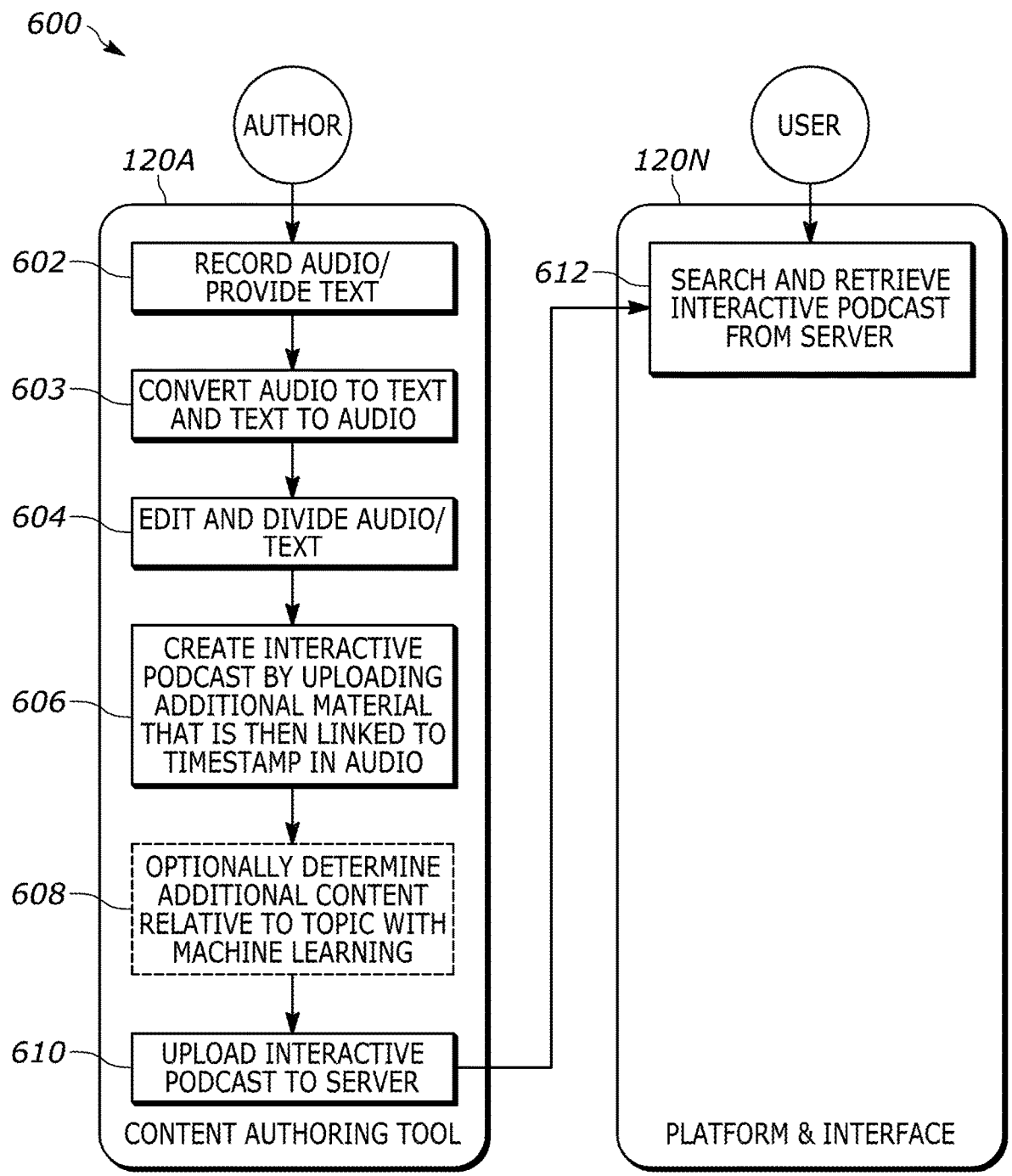
FIG. 6 is a flowchart illustrating a method for authoring an interactive podcast with a content authoring toolkit.

FIG. 6 is a flowchart illustrating a method 600 for authoring and consuming an interactive podcast with a content authoring toolkit. FIG. 6 is described with respect to FIG. 5.

The method 600 includes recording audio and/or providing text with the mobile device 120A (at block 602). For example, the audio may be recorded and the text may be provided by a smartphone or a desktop computer. As described and illustrated by graphical user interfaces 1600-1800 and FIGS. 16-18 below.

The method 600 includes converting audio to text and/or converting text to audio with the mobile device 120A (at block 603). For example, the audio is transcribed into text and the text is converted into computer-generated audio. As described and illustrated by graphical user interface 1900 and FIG. 19 below.

The method 600 includes editing and dividing the audio and/or text with the mobile device 120A (at block 604). As described and illustrated by graphical user interface 2000 and FIG. 20 below.

The method 600 includes creating an interactive podcast by uploading additional material (e.g., topic references, topic references, links, articles, exercises) that is then linked to a timestamp in the audio with the mobile device 120A (at block 606). Optionally, in some examples, the method 600 may also include determining additional content relative to topic using machine learning on the additional material that is uploaded with the mobile device 120A (at block 608). As described and illustrated by graphical user interfaces 2100-2400 and FIGS. 21-24 below.

The method 600 includes uploading the interactive podcast to the server 100 for administrative review before access by other users with the mobile device 120A (at block 610). As described and illustrated by graphical user interface 2500 and FIG. 25 below.

Lastly, after the administrative review is completed, a mobile device 120N may search the server 100 and retrieve the interactive podcast from the server 100 (at block 612). As described and illustrated by graphical user interface 1500 and FIG. 15 below.

Figure 7:
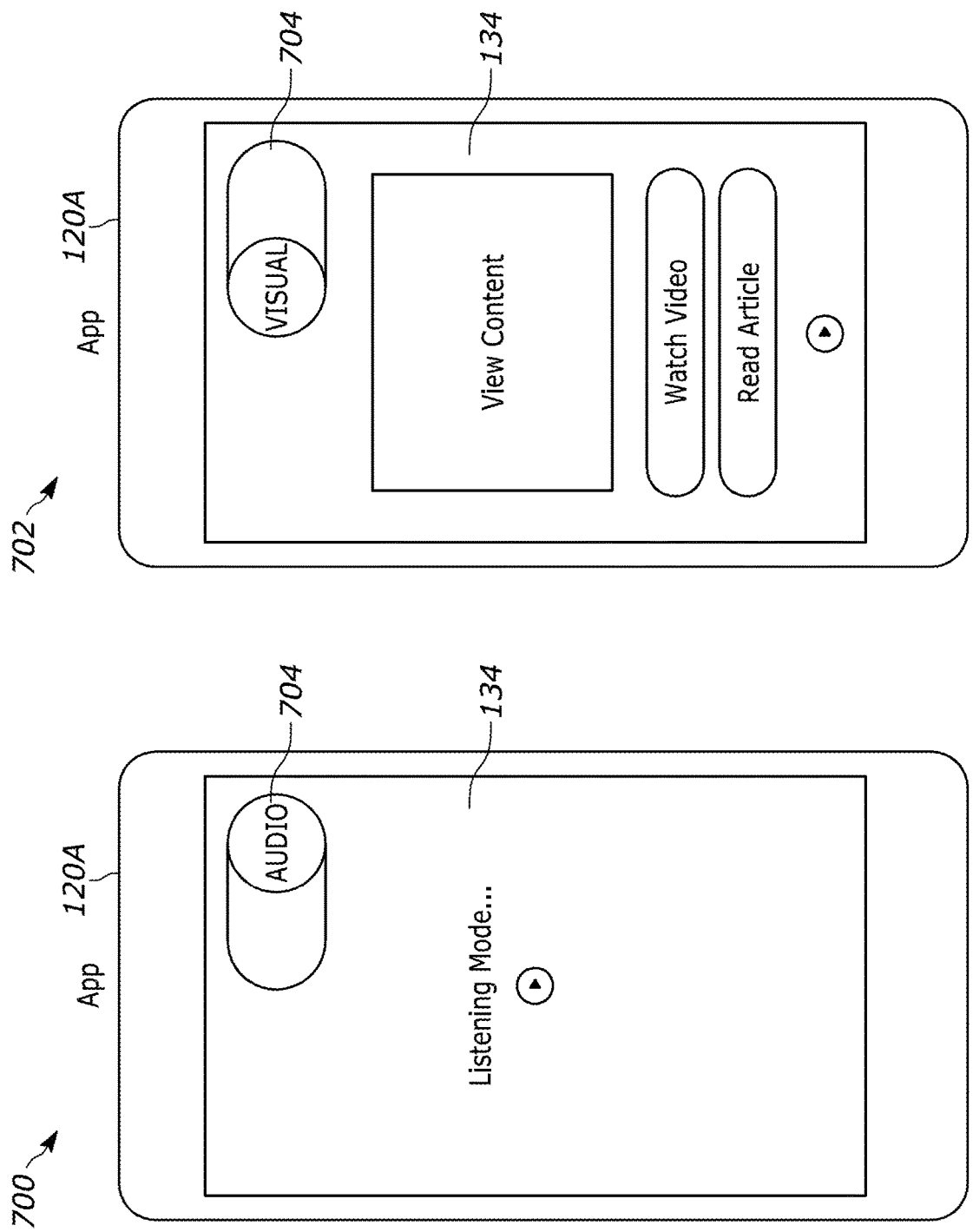
FIG. 7 is an image illustrating a seventh example graphical user interface and an eighth example graphical user interface as part of an audio/visual toggle feature in the interactive podcast platform of FIG. 1.

FIG. 7 is an image illustrating a seventh example graphical user interface 700 and an eighth example graphical user interface 702 as part of an audio/visual toggle feature in the interactive podcast platform of FIG. 1.

As illustrated in FIG. 7, a user-controlled graphical user interface element 704 allows the user to toggle between audio/visual mode and audio-only mode. When in audio/visual mode, the user hears the audio of the podcast, and the interactive podcast platform application 126 presents additional visual content that is contextually related to the podcast based on a visual toggle of the element 704. The additional visual content including reading articles, drawing sketches, or other suitable visual information.

Alternatively, when in audio-only mode, the user hears the audio-based content, and the interactive podcast platform application 126 points out visual-based content based on an audio toggle of the element 704. However, in this instance, the interactive podcast platform application 126 encourages the user to return later to select the visual toggle and access the visual content.

Figure 8:
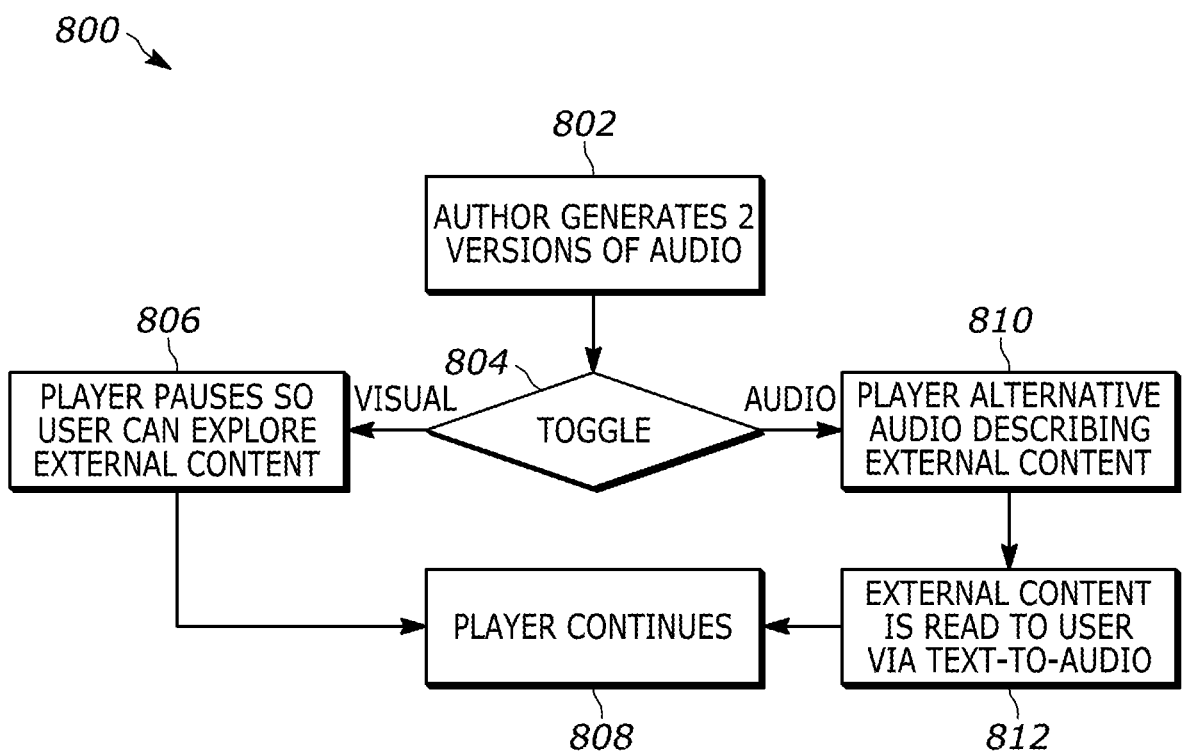
FIG. 8 is a flowchart illustrating a method for operating the audio/visual toggle feature of FIG. 7.

FIG. 8 is a flowchart illustrating a method 800 for operating the audio/visual toggle feature of FIG. 7. The method 800 includes recording two versions of audio with the mobile device 120A (at block 802). The method 800 includes toggling the element 704 to select either "Visual" or "Audio" with the mobile device 120A (at decision block 804).

Upon selecting "Visual," the method 800 includes pausing the audio while the user consumes the visual content (at block 806). After consuming the visual content, the method 800 includes continuing with the audio playback (at block 808).

Upon selecting "Audio," the method 800 includes playing the alternative audio that describes the visual content (at block 810). After consuming the alternative audio content, the method 800 includes reading the visual content to the user via text-to-audio (at block 812). After reading the visual content to the user, the method 800 includes continuing with the audio playback (at block 808).

Figure 9:
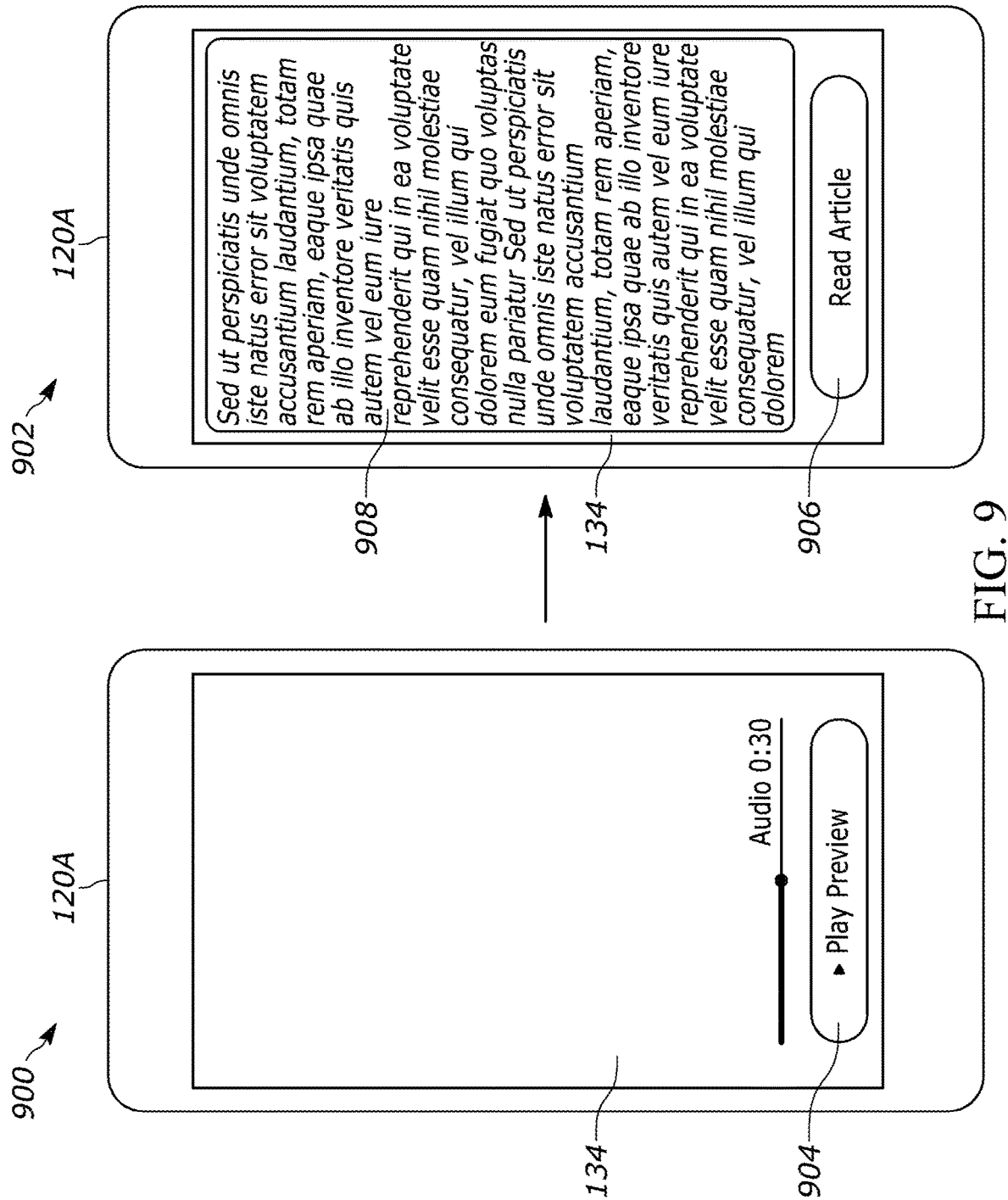
FIG. 9 is an image illustrating a transition between a ninth example graphical user interface and a tenth example graphical user interface as part of an audio-led link feature in the interactive podcast platform of FIG. 1.

FIG. 9 is an image illustrating a transition between a ninth example graphical user interface 900 and a tenth example graphical user interface 902 as part of an audio-led link feature in the interactive podcast platform of FIG. 1. In the example of FIG. 9, the ninth example graphical user interface 900 includes a graphical user interface element 904 and the tenth example graphical user interface 902 includes a graphical user interface element 906 and a visual information section 908.

Figure 10:
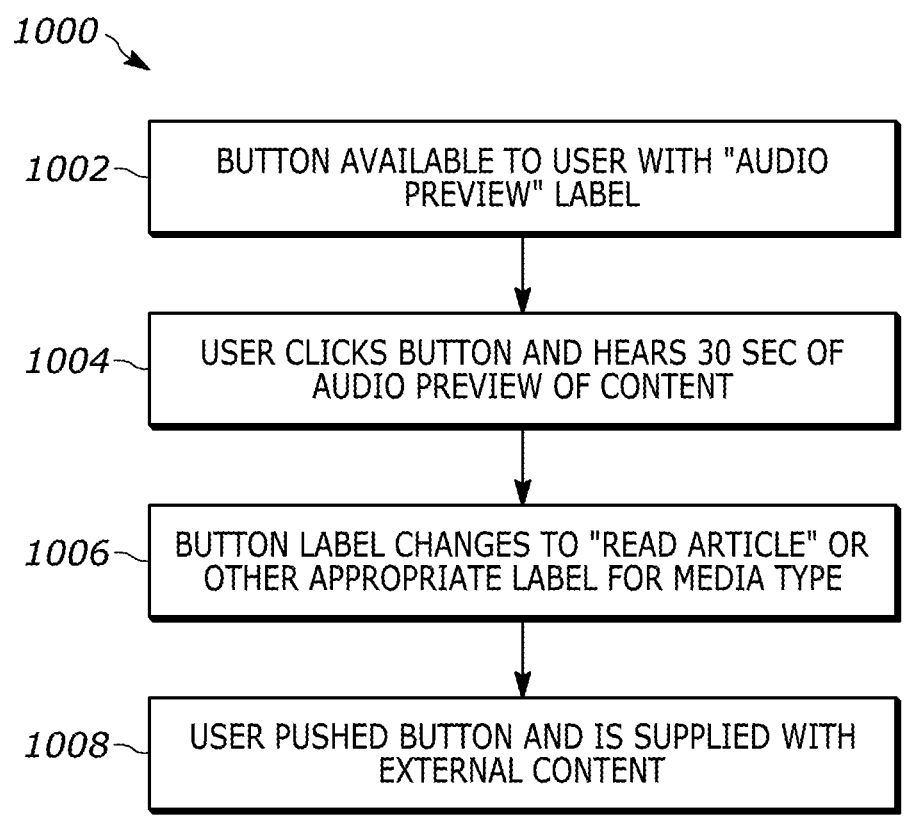
FIG. 10 is a flowchart illustrating a method for operating the audio-led link feature of FIG. 9.

FIG. 10 is a flowchart illustrating a method 1000 for operating audio-led link feature of FIG. 9. The method 1000 includes providing the element 904 with the "Audio Preview" label with the mobile computing device 120A (at block 1002). The method 1000 includes tapping the element 904 to play the audio preview with the mobile computing device 120A (at block 1004). When the audio preview completes (usually around 30 seconds), the ninth example graphical user interface 900 transitions on the mobile computing device 120A to the tenth example graphical user interface 902 with the element 906, which may be a clickable 'Read the article' button (at block 1006). The user taps the element 906 on the display screen 134 of the mobile computing device 120A to read the full content in the visual information section 908 of the tenth example graphical user interface 902 (at block 1008).

Figure 11:
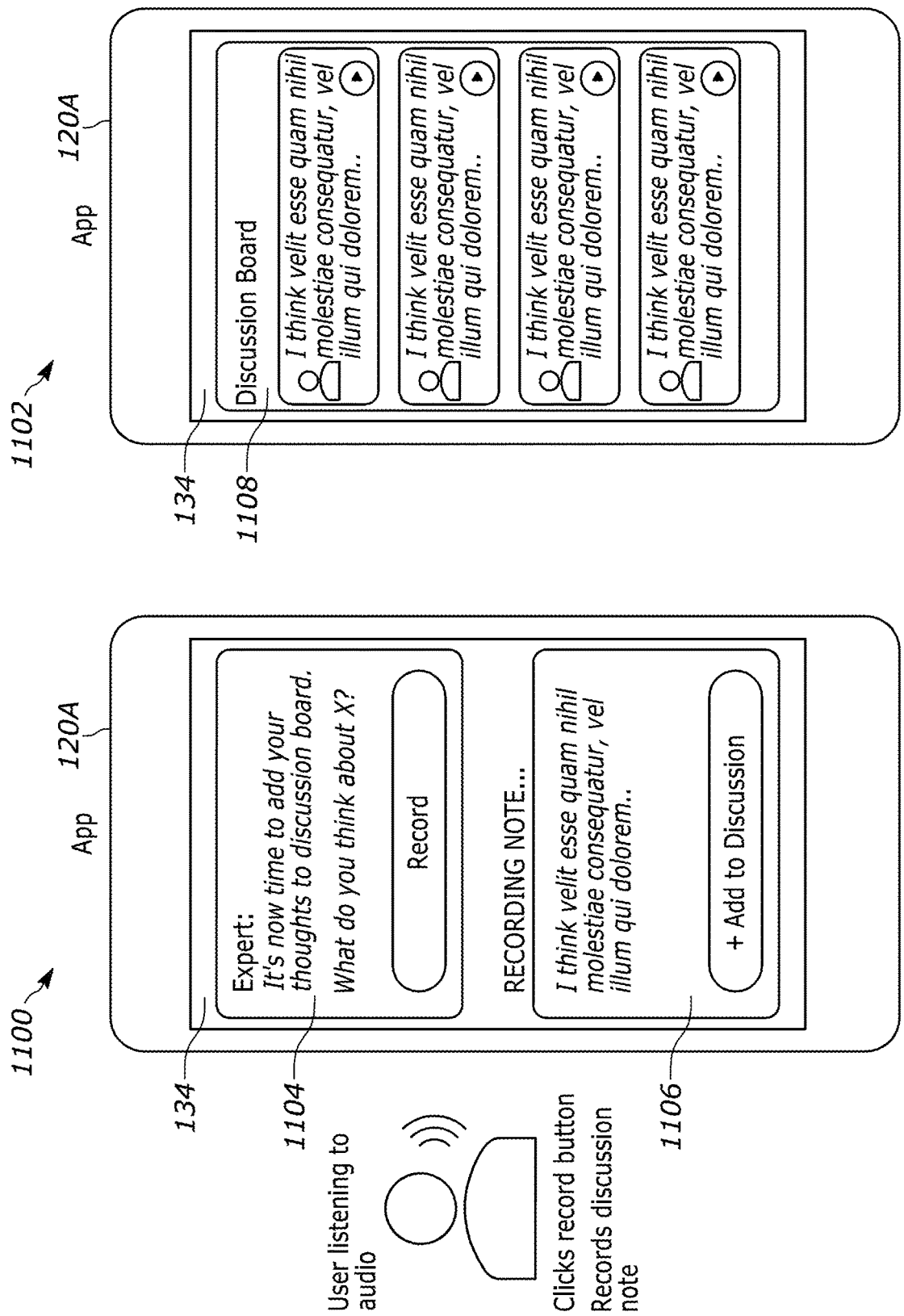
FIG. 11 is an image illustrating an eleventh example graphical user interface and a twelfth example graphical user interface as part of an audio-based discussion board feature in the interactive podcast platform of FIG. 1.

FIG. 11 is an image illustrating an eleventh example graphical user interface 1100 and a twelfth example graphical user interface 1102 as part of an audio-based discussion board feature in the interactive podcast platform of FIG. 1. In the example of FIG. 11, the eleventh example graphical user interface 1100 includes a record prompt 1104 and an add to discussion prompt 1106. In the example of FIG. 11, the twelfth example graphical user interface 1102 includes a list 1108 of audio-based comments from users.

Figure 12:
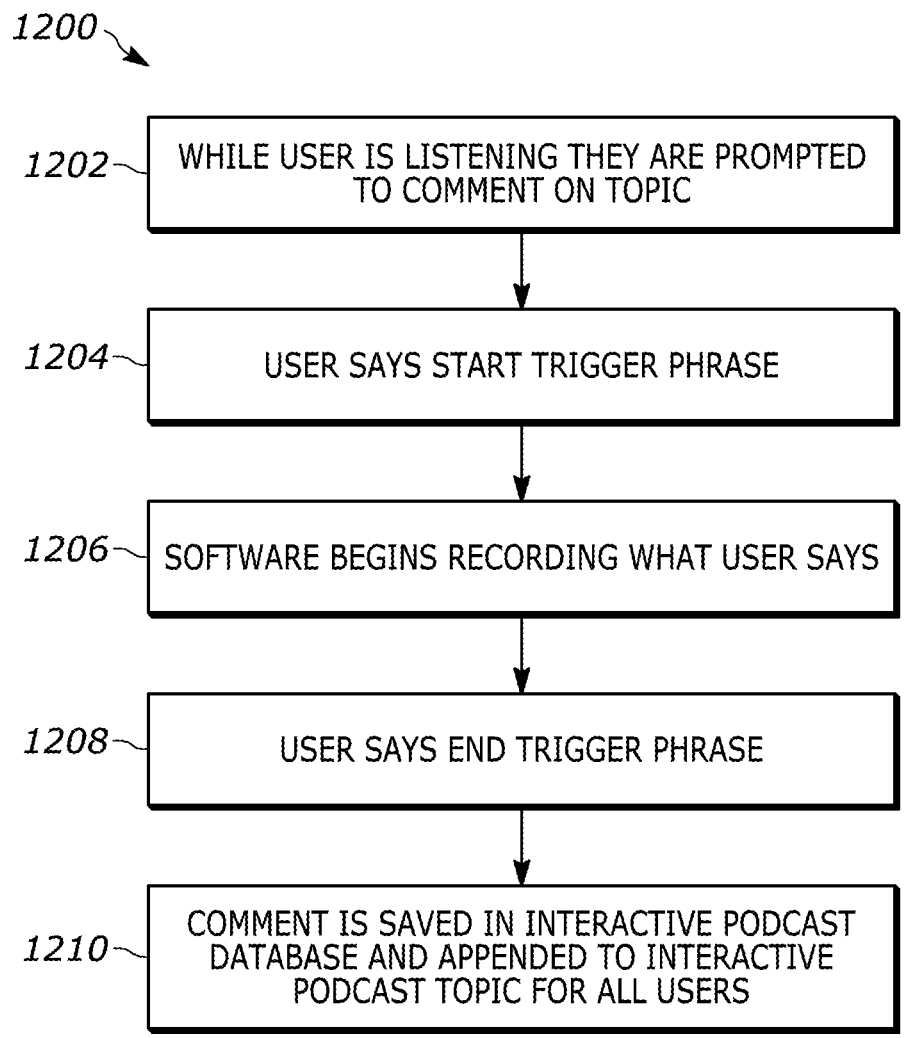
FIG. 12 is a flowchart illustrating a method for operating the audio-based discussion board of FIG. 11.

FIG. 12 is a flowchart illustrating a method 1200 for operating the audio-based discussion board of FIG. 11. The method 1200 includes prompting a user to comment on a topic while listening to the podcast with the mobile computing device 120A (at block 1202). The method 1200 includes receiving a trigger phrase from the user with the mobile computing device 120A (at block 1204). The method 1200 includes recording the user with the mobile computing device 120A in response to the trigger phrase (at block 1206). The method 1200 includes receiving an end trigger phrase from the user with the mobile computing device 120A (at block 1208). The method 1200 includes storing the recorded audio in the additional audio/visual content database 110 and appending the recorded audio to the topic for all users (at block 1210).

In the example of FIG. 12, the audio-based, audio-only discussion board mirrors the mechanics of traditional, text-based discussion group. A user listens to a podcast, and the interactive podcast platform application 126, in audio, prompts the user to join the discussion. The user gives the audio command to the app: "[Insert App Name], record comment." The interactive podcast platform application 126 goes into listen/record mode and the user is able to leave a limited audio comment (e.g., one minute). This audio comment is saved to the additional audio/visual content database 110 and appended to the other third-party content. In some examples, other users who listen to the podcast, upon podcast completion, can hear the comments/discussion of previous users. At any time, users can join in the conversation stream, adding their own audio-based comments.

Figure 13:
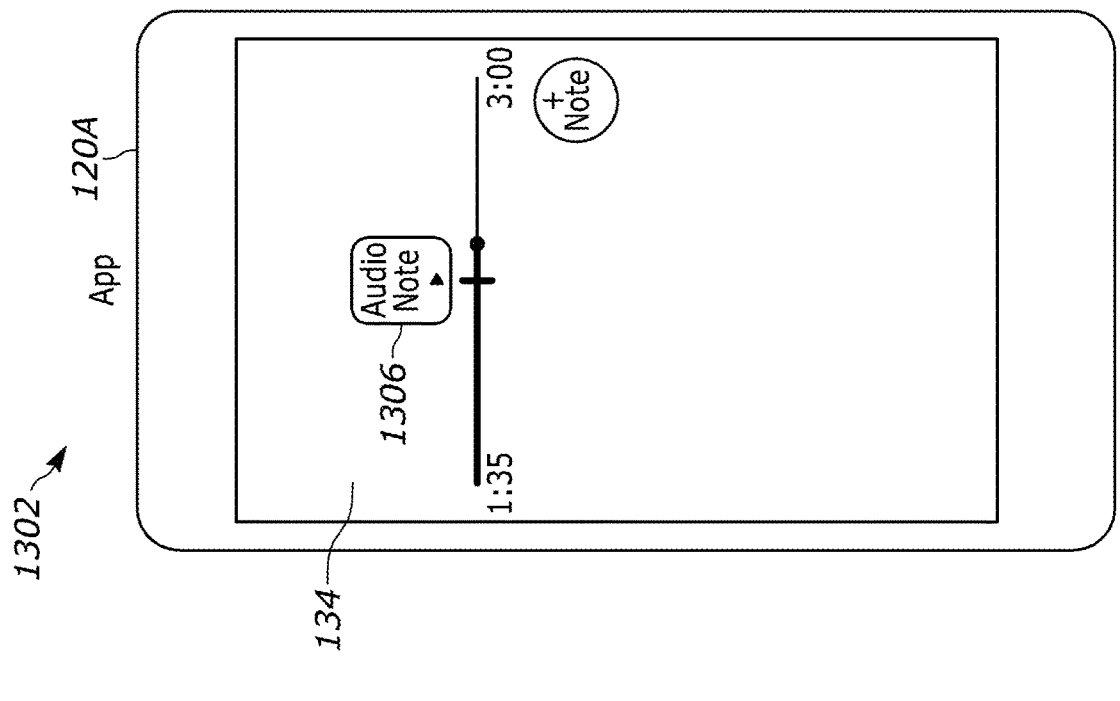
FIG. 13 is an image illustrating a thirteenth example graphical user interface and fourteenth example graphical user interface as part of a timeline-based audio notes feature in the interactive podcast platform of FIG. 1.
Figure 13:
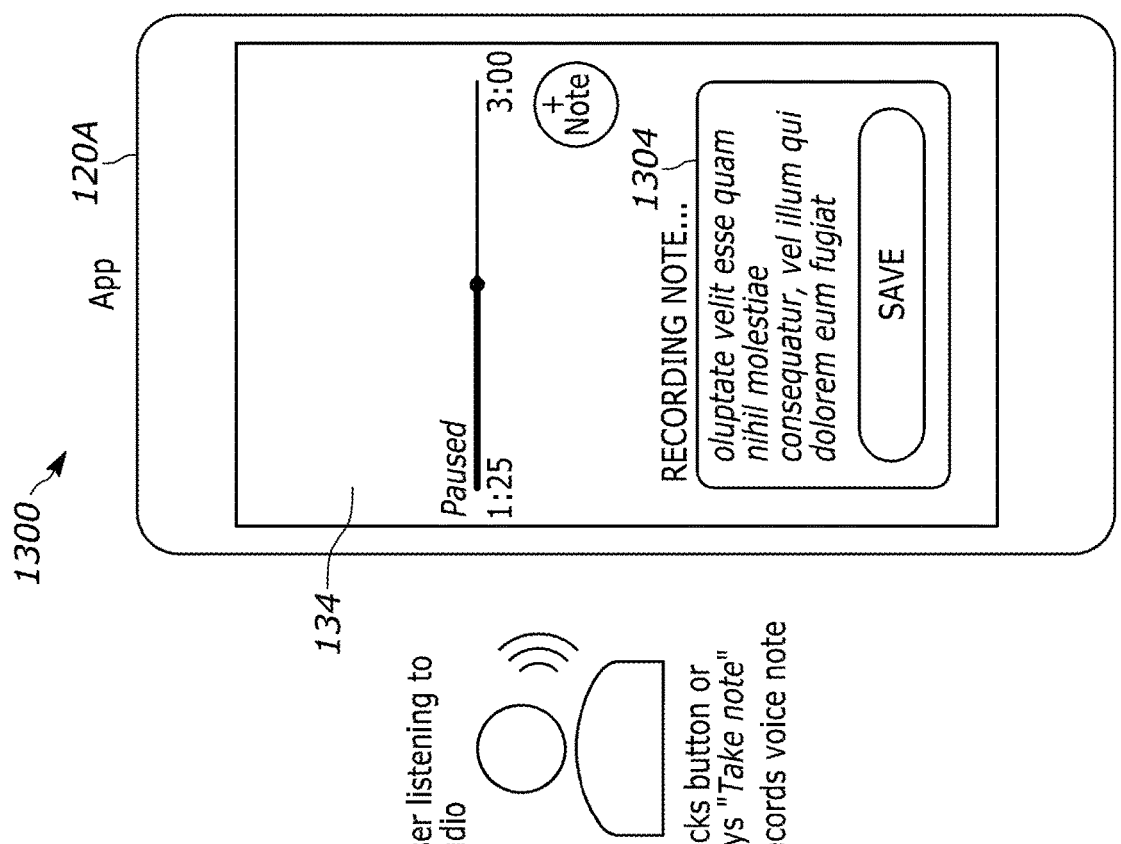

FIG. 13 is an image illustrating a thirteenth example graphical user interface 1300 and fourteenth example graphical user interface 1302 as part of a timeline-based audio notes feature in the interactive podcast platform of FIG. 1. In the example of FIG. 13, the thirteenth example graphical user interface 1300 includes a record prompt 1304. In the example of FIG. 13, the fourteenth example graphical user interface 1302 includes a notation 1306 of audio-based note from a user on a timeline of the audio playback.

Figure 14:
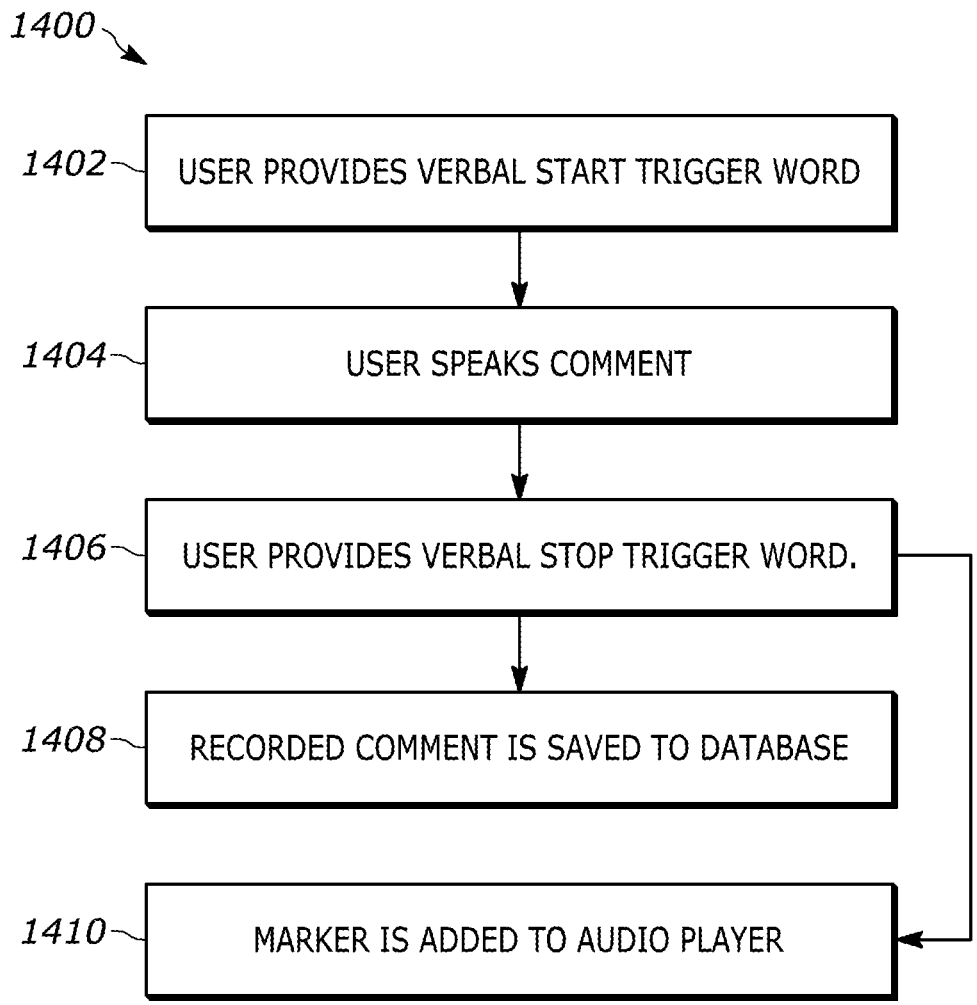
FIG. 14 is a flowchart illustrating a method for operating the timeline-based audio notes method of FIG. 13.

FIG. 14 is a flowchart illustrating a method 1400 for operating the timeline-based audio notes method of FIG. 13. The method 1400 includes receiving a trigger word or phrase from the user with the mobile computing device 120A (at block 1402). The method 1400 includes recording the user with the mobile computing device 120A in response to the trigger word or phrase (at block 1404). The method 1400 includes receiving an end trigger word or phrase from the user with the mobile computing device 120A (at block 1406). The method 1400 includes storing the recorded audio in the additional audio/visual content database 110 and appending the recorded audio to the topic for all users (at block 1410). The method 1400 includes adding a notation or marker to a timeline of the audio player that is linked to the recorded audio note (at block 1410).

In the example of FIG. 14, while listening to the podcast, a user may provide an audio prompt to the interactive podcast platform application 126 to pause and take an audio note. When the user completes the audio note, the interactive podcast platform application 126 stores the audio note in the additional visual/audio content database. The interactive podcast platform application 126 also places a visual marker in the audio play timeline, as a bookmark and reminder. On a repeat visit to the podcast, in either audio-only or audio/visual mode, the user has access to the audio notes within the context of the audio timeline. In some examples, a visual user may tap the audio note indicator to hear the content. In other examples, an audio-only user may hear the note when replaying the podcast content flow.

Additionally, in some examples, the interactive podcast platform application 126 includes an audio-hyperlinks feature. For example, when the user is presented either visually or aurally with information that is not understood by the user, the interactive podcast platform application 126 may receive a trigger word or phrase from the user followed by "what is X?" The interactive podcast platform application 126 may perform an online or local search and respond with either a visual or aural prompt regarding X.

Additionally, in some examples, the interactive podcast platform application 126 includes a machine learning engine that learns based on a user's history. For example, the interactive podcast platform application 126 keeps a history of what a user listens to—what podcast and what steps; when the user rewinds, fast forwards, skips ahead, searches, repeats steps; what third-party content the user reads/listens to; what the user shares; and what the user comments on in the discussion group. The machine learning engine, as part of the interactive podcast program 106, analyzes this information from the interactive podcast platform application 126, compares the user's history to the behaviors and actions of other users, and controls the interactive podcast platform application 126 to present new learning recommendations based on these learnings. The interactive podcast program 106 understands the different modes of learning that are preferred by listeners.

Figure 15:
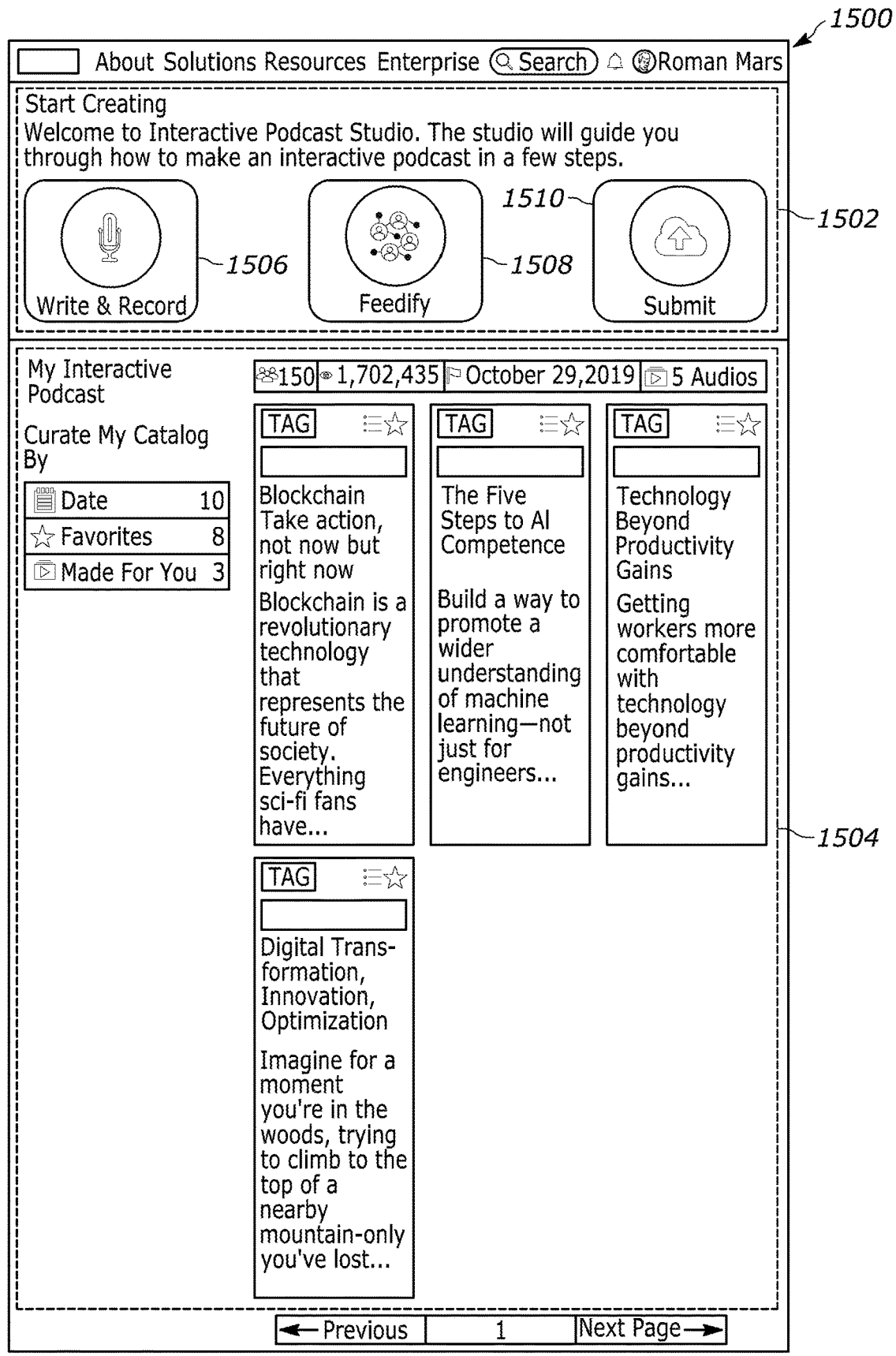

FIGS. 15-25 are example graphical user interfaces that collectively illustrate one example of the content authoring toolkit as described above with respect to FIG. 6. In the example of FIG. 15, a fifteenth graphical user interface (GUI) 1500 includes a content creation section 1502 and a content repository section 1504. The content creation section 1502 includes a write and record GUI element 1506, a feedify GUI element 1508, and a submission GUI element 1510.

The content creation section 1502 provides a means to an author to perform operations 602-610 as described above. The content repository section 1504 provides a means to a user to perform operation 612 as described above.

Figure 16:
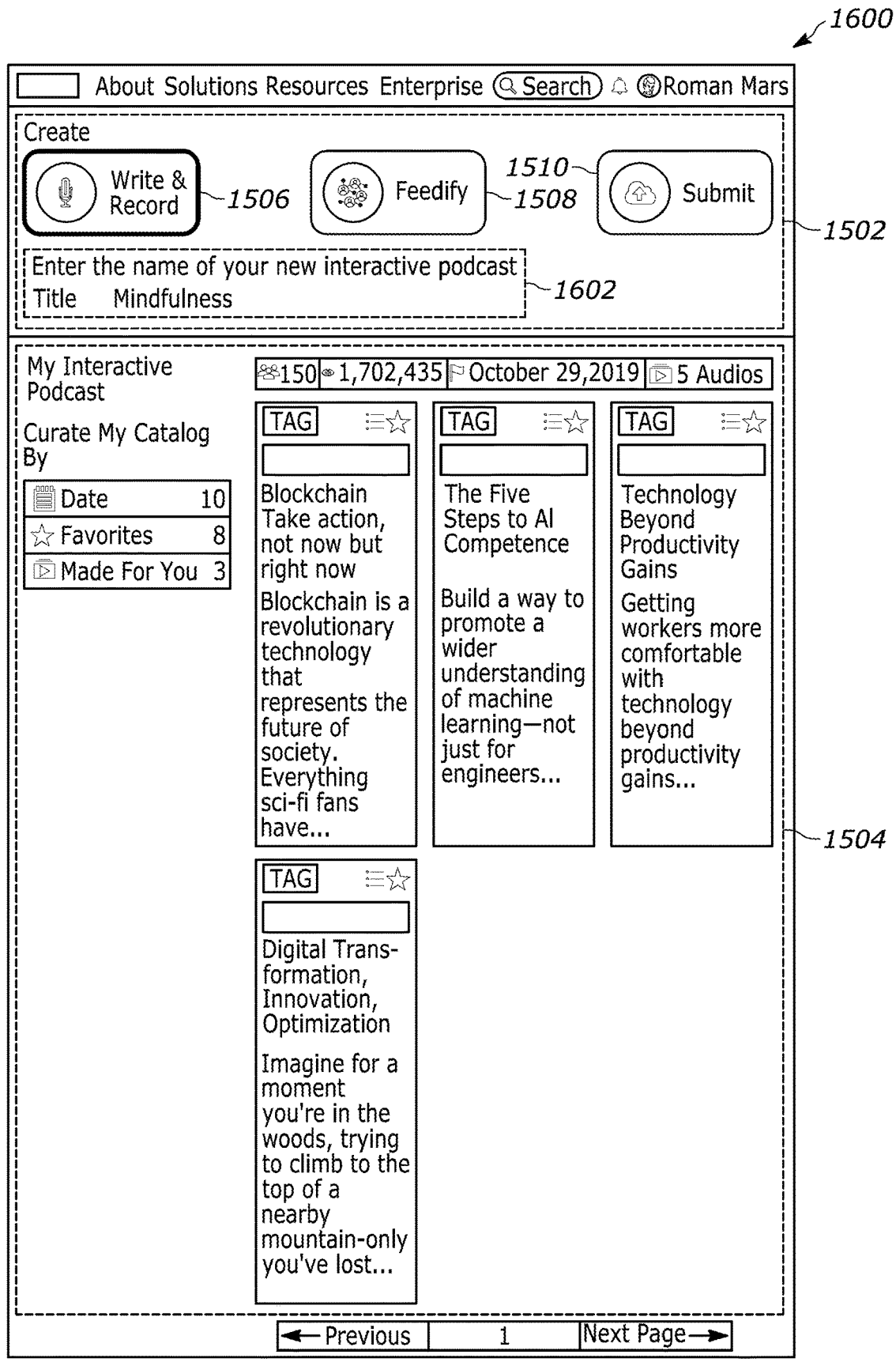
Figure 17:
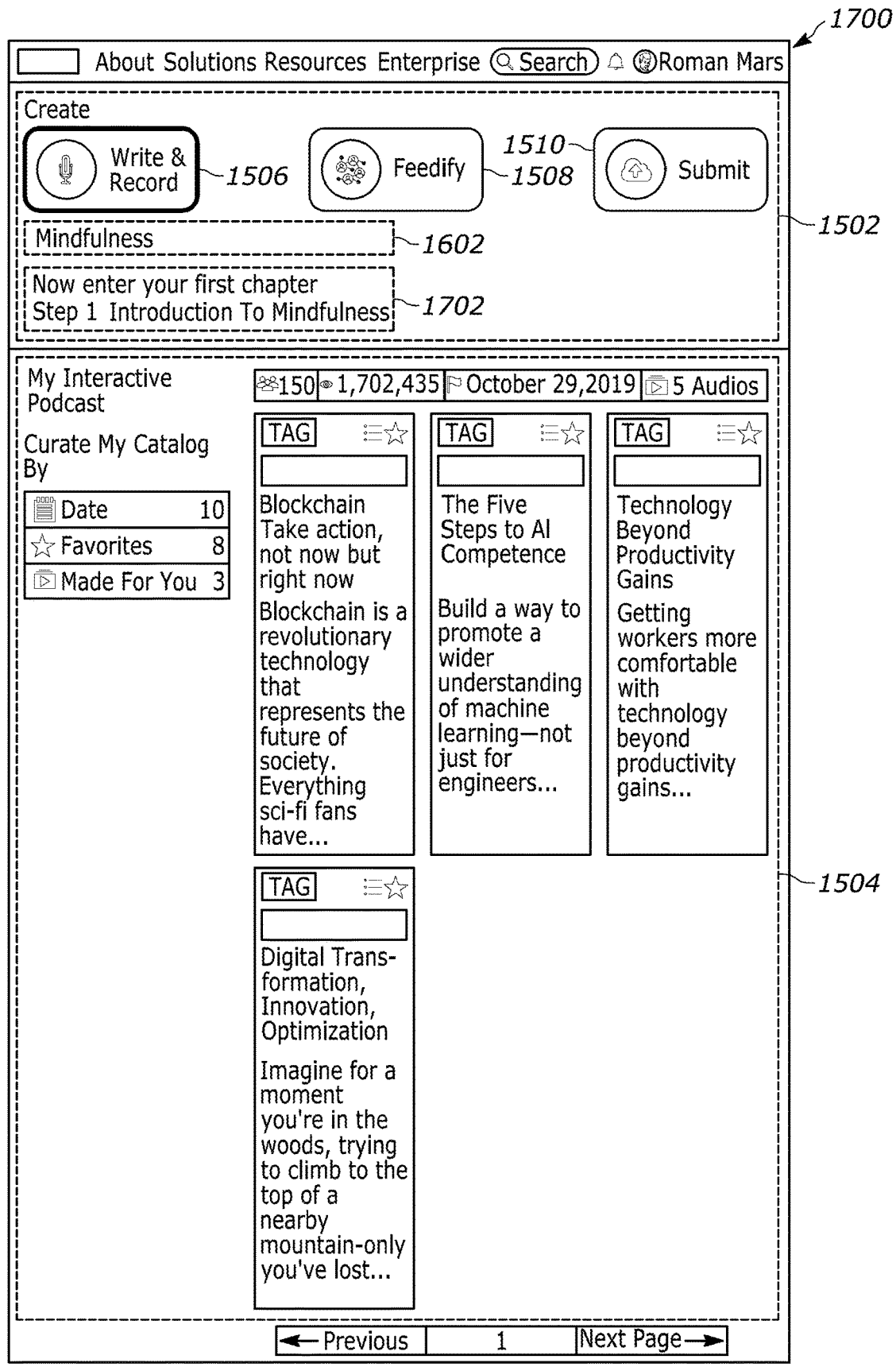

FIGS. 16-20 are images of a subset of graphical user interfaces 1600-2000 that illustrate an example flow associated with the write and record GUI element 1506. As illustrated in FIG. 16, after selecting the write and GUI element 1506 of FIG. 15, a Title text field 1602 becomes available in the graphical user interface 1600 to name new content. As illustrated in FIG. 17, after information is entered into the Title graphical field 1602, a chapter text field 1702 becomes available in the graphical user interface 1700 to name new sub-content.

Figure 18:
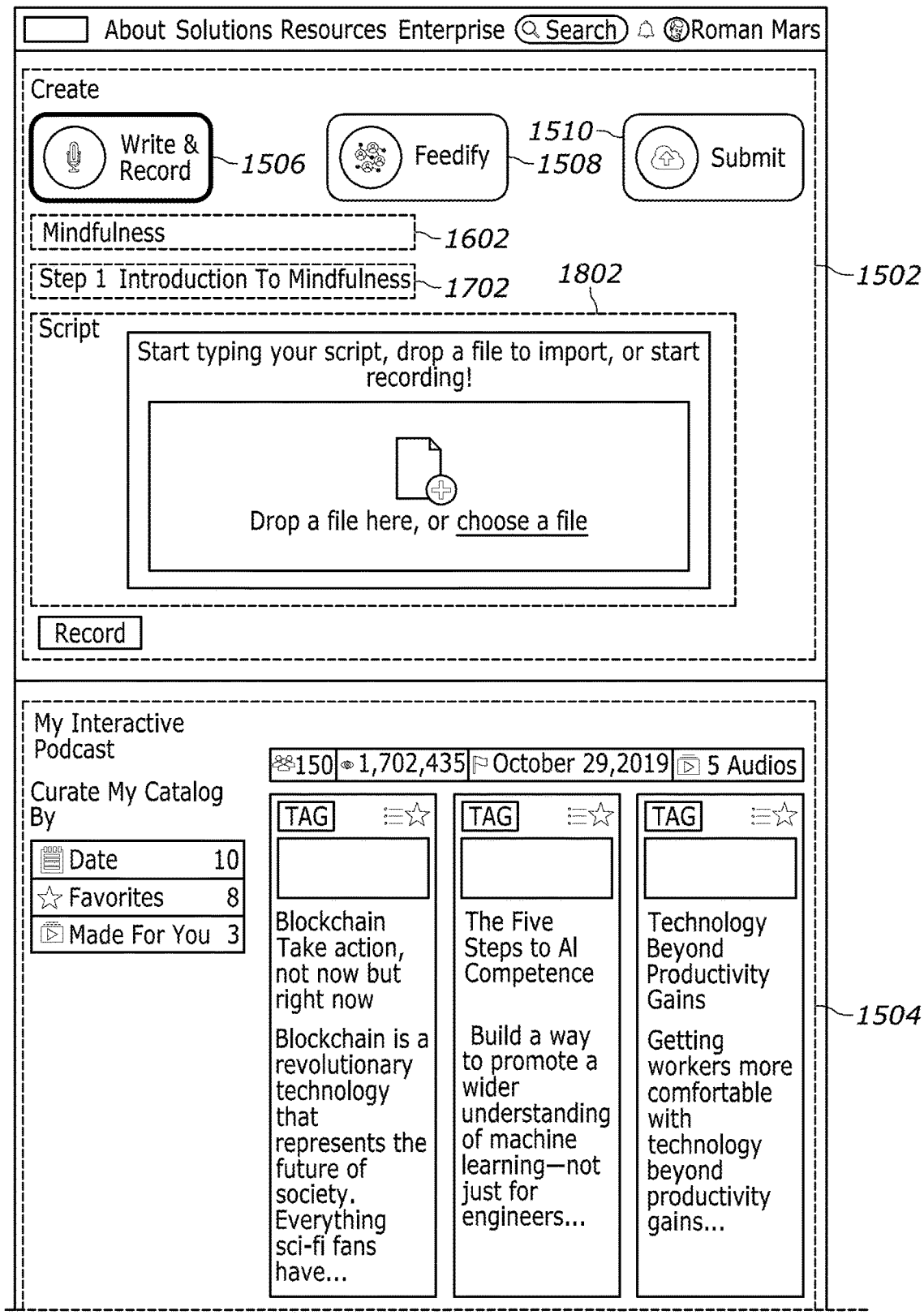

As illustrated in FIG. 18, after information is entered into the chapter text field 1702, a content field 1802 becomes available in the graphical user interface 1800 to receive textual content, audio/video sub-content, or other information. In some examples, the content field 1802 is configured to receive text, a file, a hyperlink, or other suitable information that is relevant to the chapter field 1702. For example, the text, the file, the hyperlink, or the other suitable information may include a third-party advertisement or sponsorship.

Figure 19:
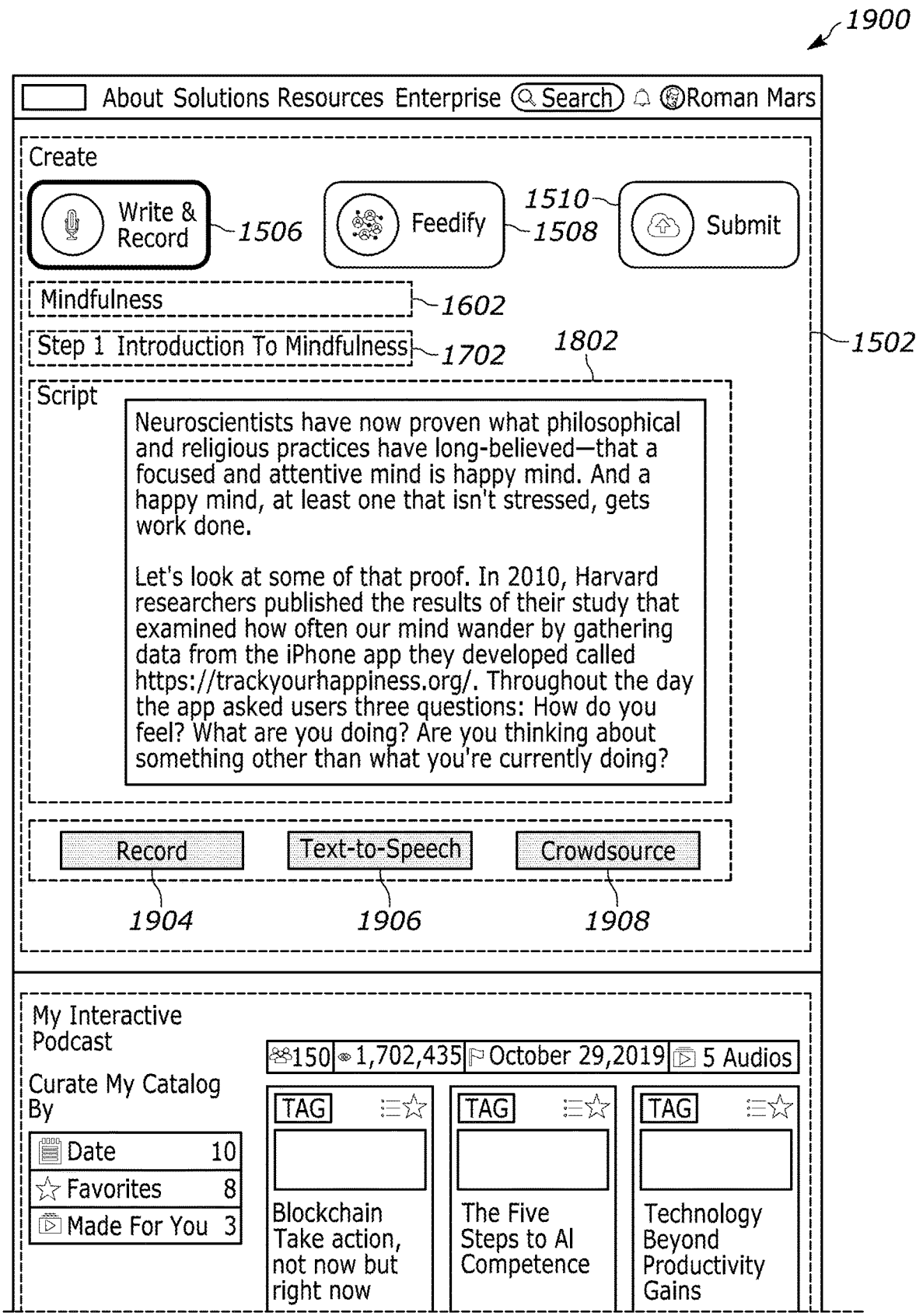
Figure 20:
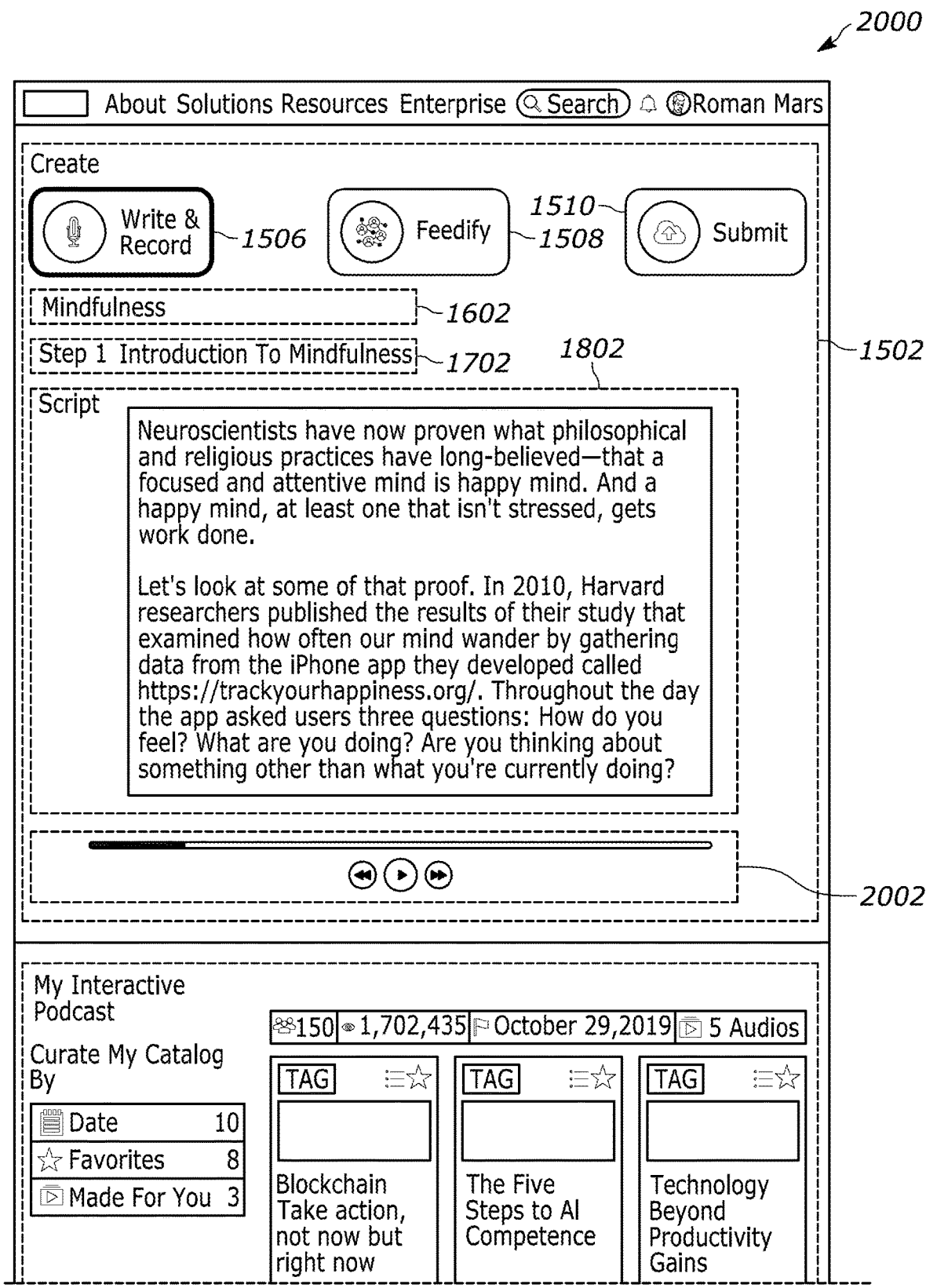

As illustrated in FIG. 19, after text is entered into the content field 1802, a second content field 1902 becomes available in the graphical user interface 1900 to receive additional information or provide information with respect to the information entered in the content field 1802. In some examples, the second content field 1902 includes a record GUI element 1904, a text-to-speech GUI element 1906, and a crowdsource GUI element 1908. The record GUI element 1904 provides a means for recording additional audio and/or video content that is relevant to the information entered into the content field 1802. The text-to-speech GUI element 1906 provides a means for playing back audio and/or video content that is relevant to the information entered into the content field 1802. The crowdsource GUI element 1908 provides a means for providing crowdsource information that is relevant to the information entered into the content field 1802. As illustrated in FIG. 20, after information is entered into the second content field 1902 and selected, a playback GUI element 2002 becomes available in the graphical user interface 2000 to playback the information entered into the second content field 1902.

Figure 21:
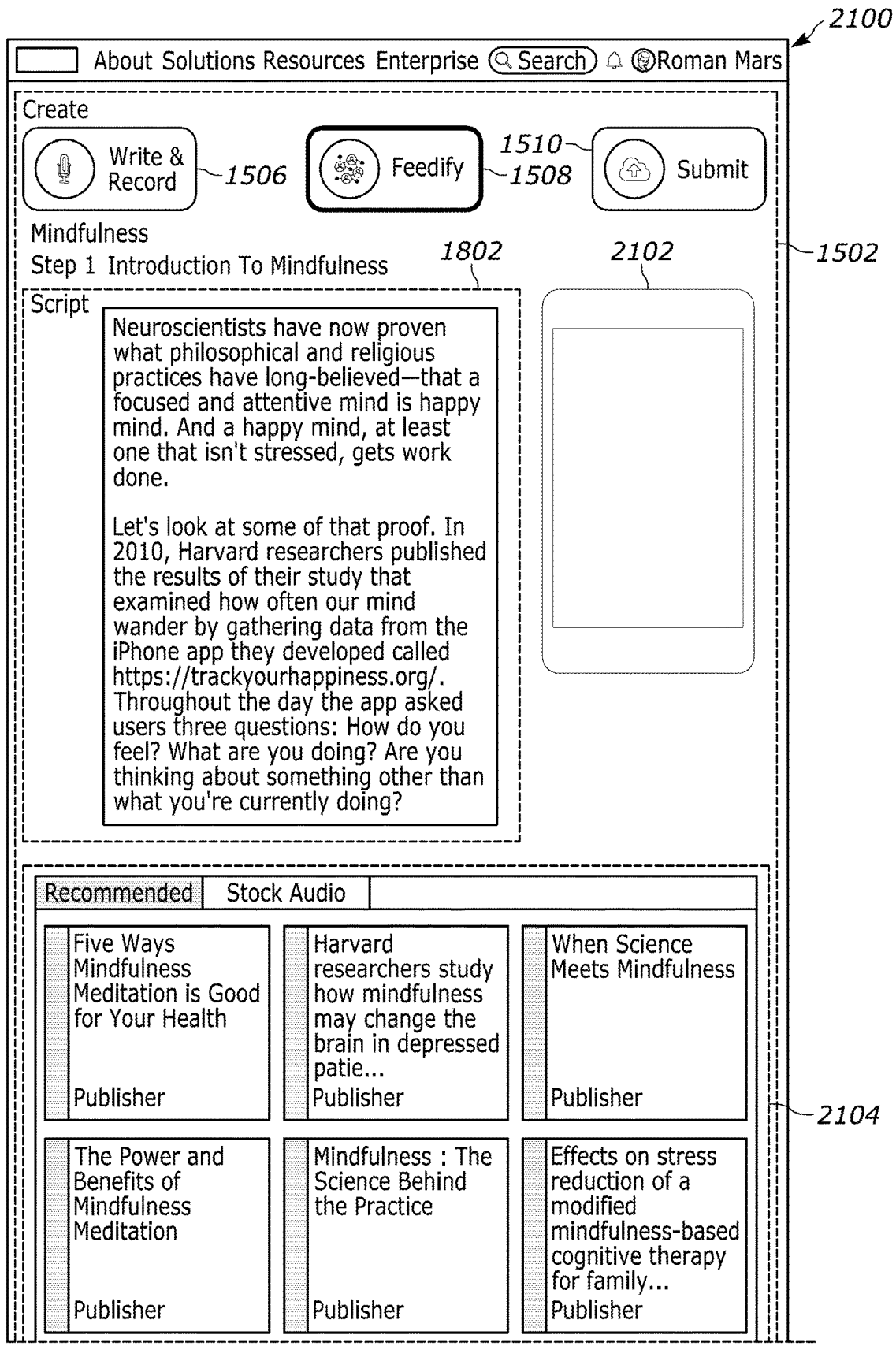
Figure 21:
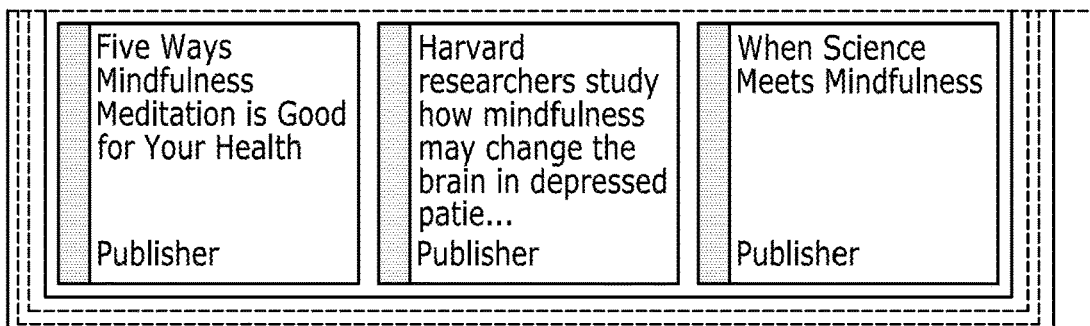

FIGS. 21-24 are images of a second subset of graphical user interfaces 2100-2500 that illustrate an example flow associated with the feedify GUI element 1508. As illustrated in FIG. 21, after selecting the feedify GUI element 1508 of FIG. 15, a smartphone screen representation image 2102 becomes available in the graphical user interface 2100 to illustrate the authored content on a given smartphone screen. Additionally, after selecting the feedify GUI element 1508 of FIG. 15, a feed section 2104 becomes available in the graphical user interface 2100 to provide available feeds for selection and incorporation into the authored content.

Figure 22:
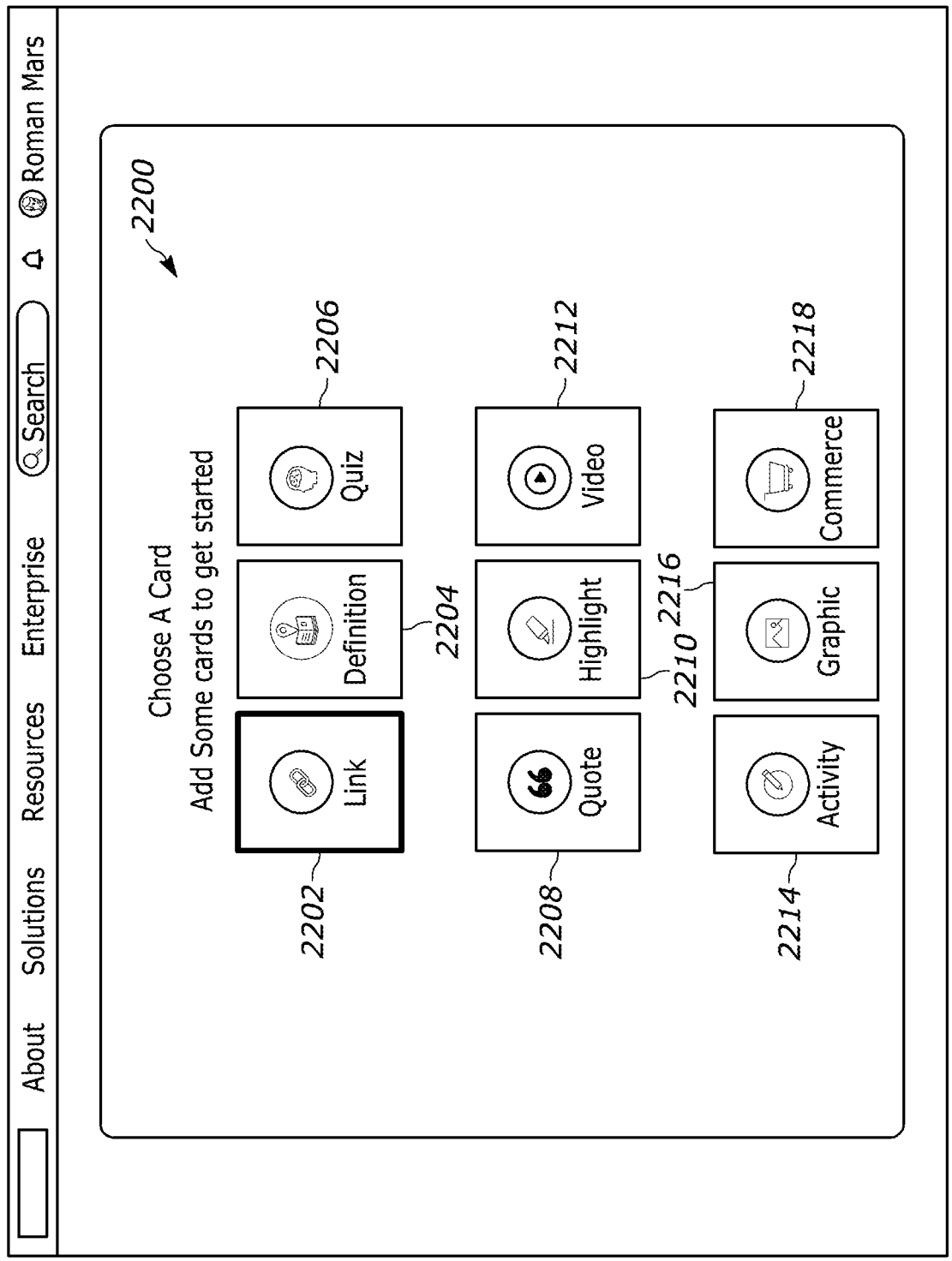

As illustrated in FIG. 22, after selecting some text in the content field 1802 of the graphical user interface 2100, an edit menu GUI 2200 is available for selection of an edit operation with respect to the selected text in the content field 1802. The edit operations of the edit menu GUI 2200 include a hyperlink operation 2202, a definition operation 2204, a quiz operation 2206, a quote operation 2208, a highlight operation 2210, a video operation 2212, an activity operation 2214, a graphic operation 2216, and a commerce operation 2218. The hyperlink operation 2202 associates a hyperlink with the selected text. The definition operation 2204 associates a specific definition with the selected text. The quiz operation 2206 associates a specific quiz to the selected text. The quote operation 2208 associates a specific quote with the selected text. The highlight operation 2210 highlights the selected text with a specific highlighting color. The video operation 2212 associates a specific video with the selected text. Activity operation 2214 associates a specific activity with the selected text. The graphic operation 2216 associates a specific graphic with the selected text. Lastly, the commerce operation 2218 associates a specific product or other commercial activity the selected text.

Figure 23:
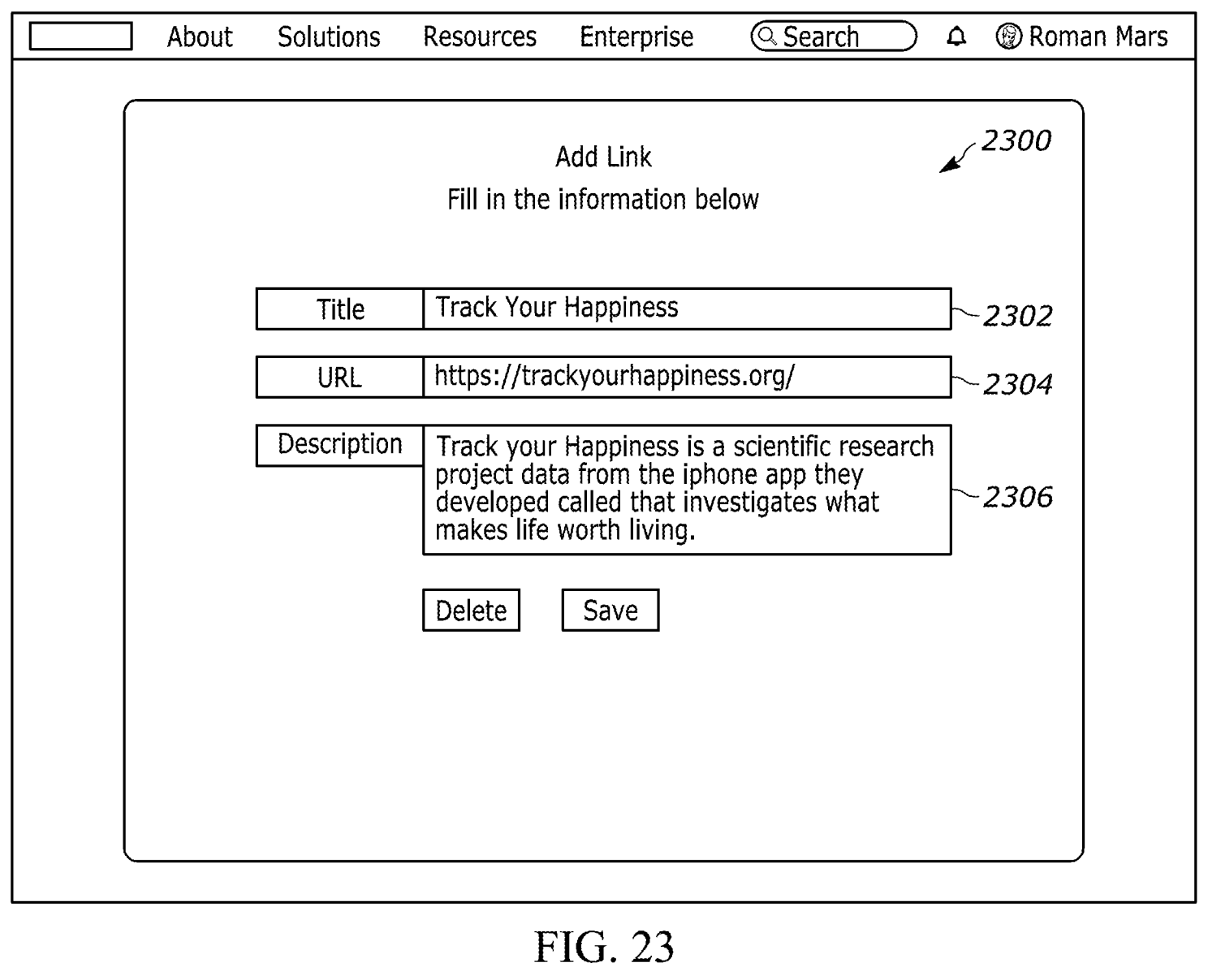

As illustrated in FIG. 23, after selecting the hyperlink operation 2202 from the edit menu GUI 2200, a customized link GUI 2300 is available for customizing the link associated with the selected text. The customized link GUI 2300 includes a title content field 2302, a URL content field 2304, and a description content field 2306.

Figure 24:
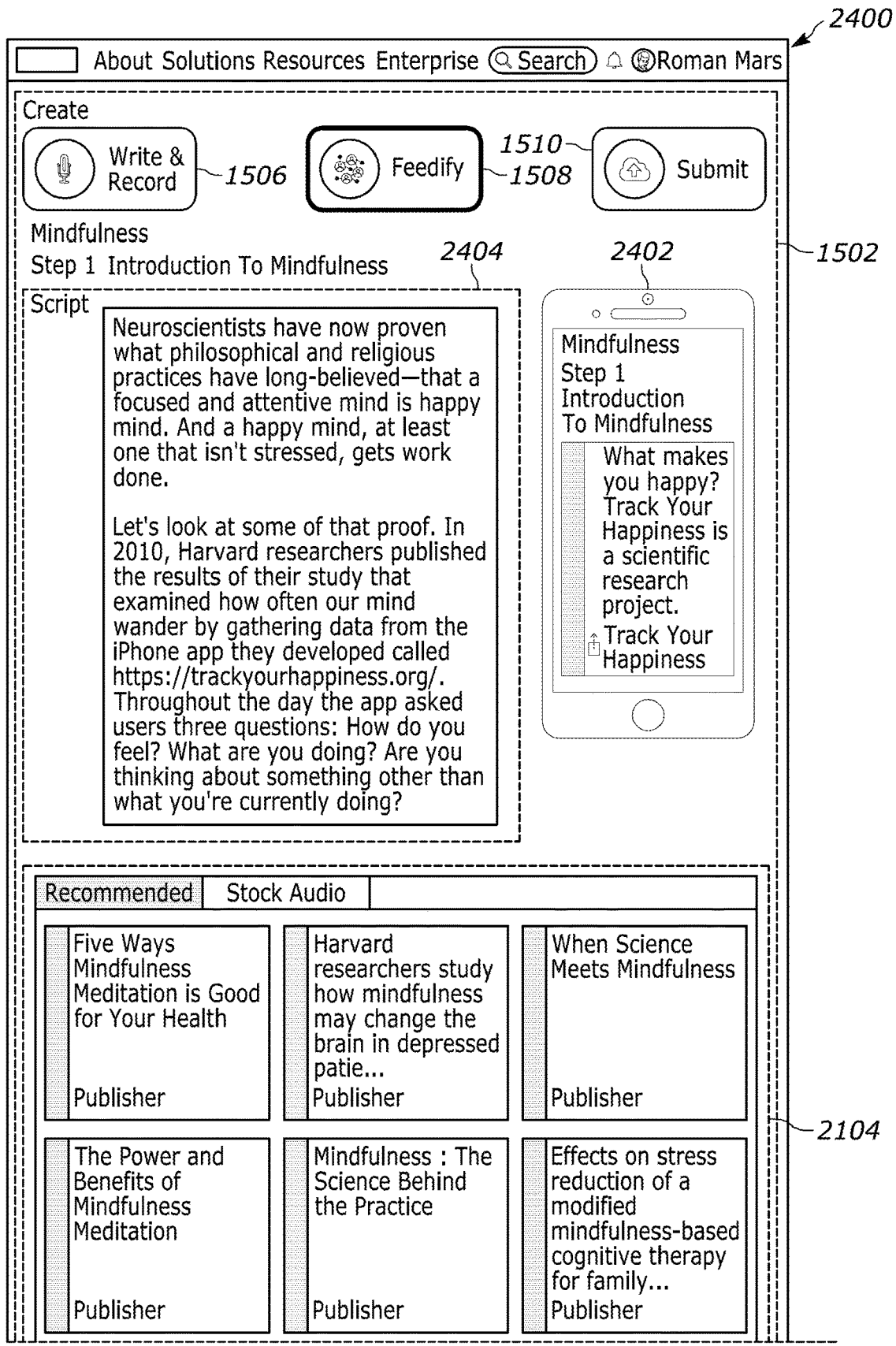

Lastly, as illustrated in FIG. 24, after customizing the link associated with the selected text with the customized link GUI 2300, a second smartphone screen representation image 2402 becomes available in the graphical user interface 2400 to illustrate the authored content from the graphical user interfaces 1600-2300 on a given smartphone screen. Additionally, the graphical user interface 2400 generates an updated content field 2404 to illustrate the selected text being associated with a hyperlink from the graphical user interfaces 2200 and 2300.

Figure 25:
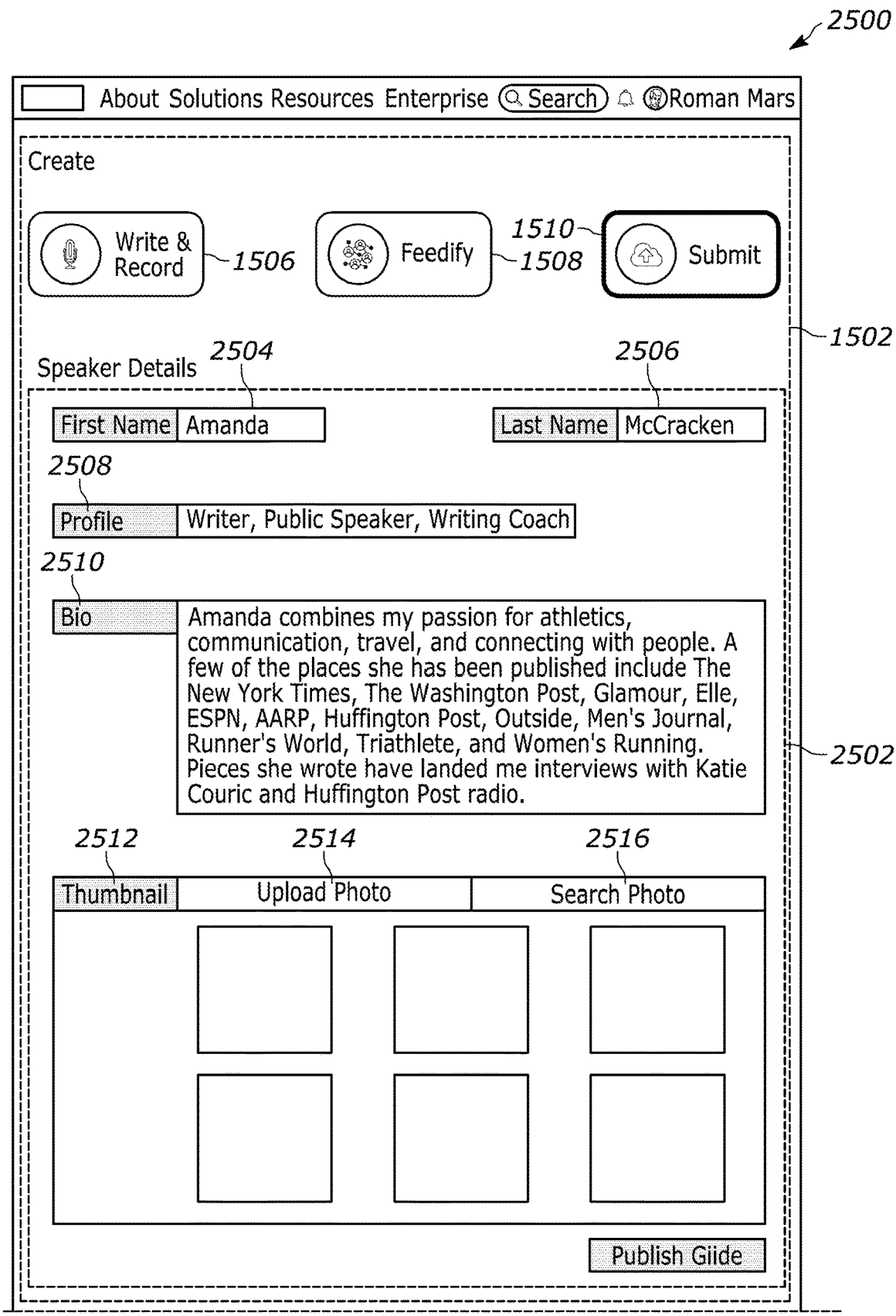

FIG. 25 is an image of graphical user interface 2500 that illustrates an author information section 2502 in the content creation section 1502 that is associated with the submission GUI element 1510. As illustrated in FIG. 25, after selection of the submission GUI element 1510, the content creation section 1502 updates to include the author information section 2502. The author information section 2502 includes a first name field 2504, a last name field 2506, a profile field 2508, a biography field 2510, a thumbnail selection section 2512, and a publish GUI element 2514.

The first name field 2504 receives the first name of the author of the content. The last name field 2506 receives the last name of the author of the content. The profile field 2508 receives information regarding the profile of the author of the content. The biography field 2510 receives information regarding the biography of the author of the content.

The thumbnail selection section 2512 includes a thumbnail upload component 2516 and a thumbnail search component 2518. The thumbnail upload component 2516 provides a means for the author of the content to upload an image for association with the content. The thumbnail search component 2518 provides a means for the author of the content to search for an image to associate with the content. Lastly, the publish GUI element 2514 associates the information provided in the author information section 2502 with the content created through the flows with the graphical user interfaces 1600-2400 and stores the authored content for administrative review.

Figure 26:
FIGS. 26-28 are images of graphic user interfaces that illustrate an administrative review of various authored content.
Figure 27:
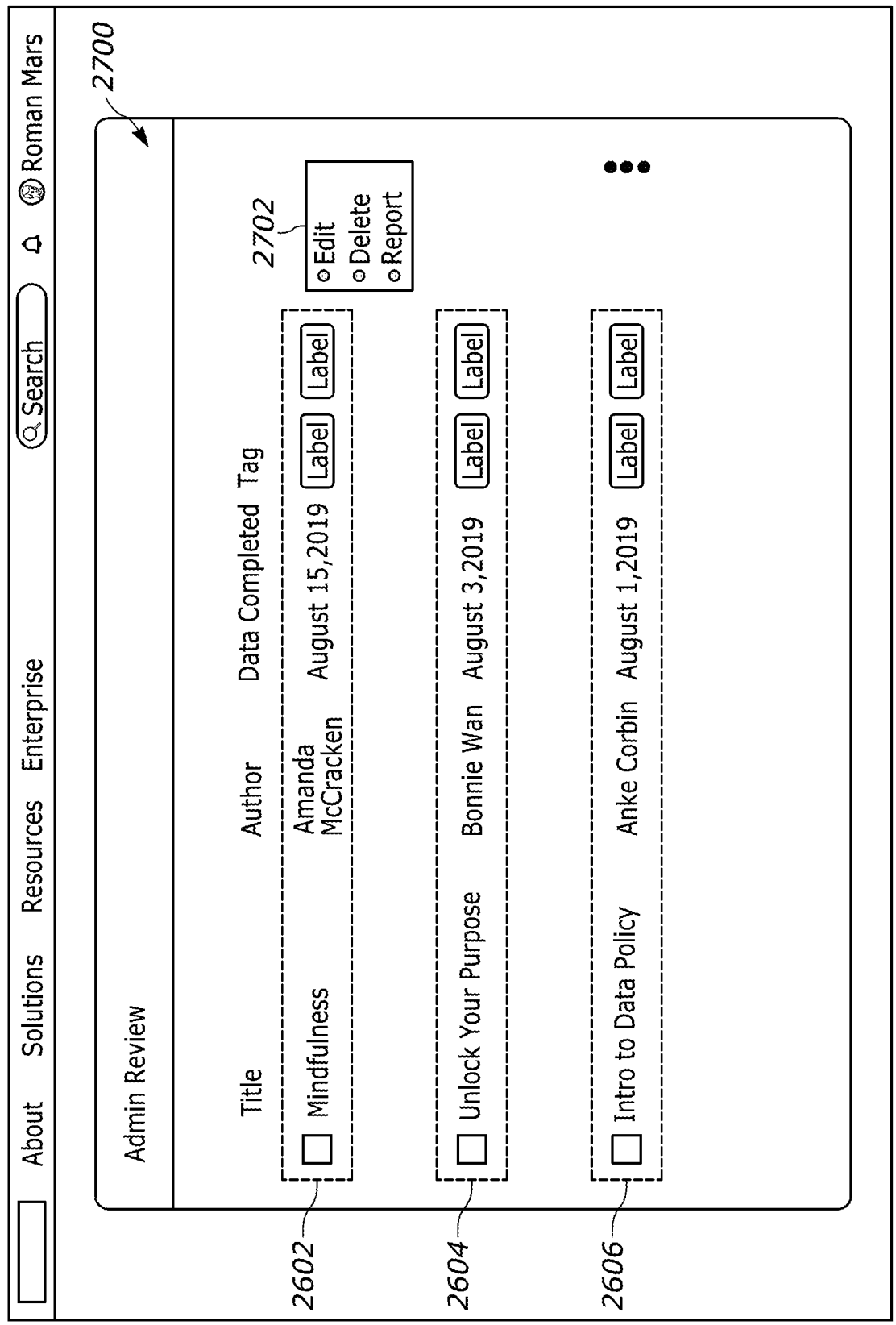
Figure 28:
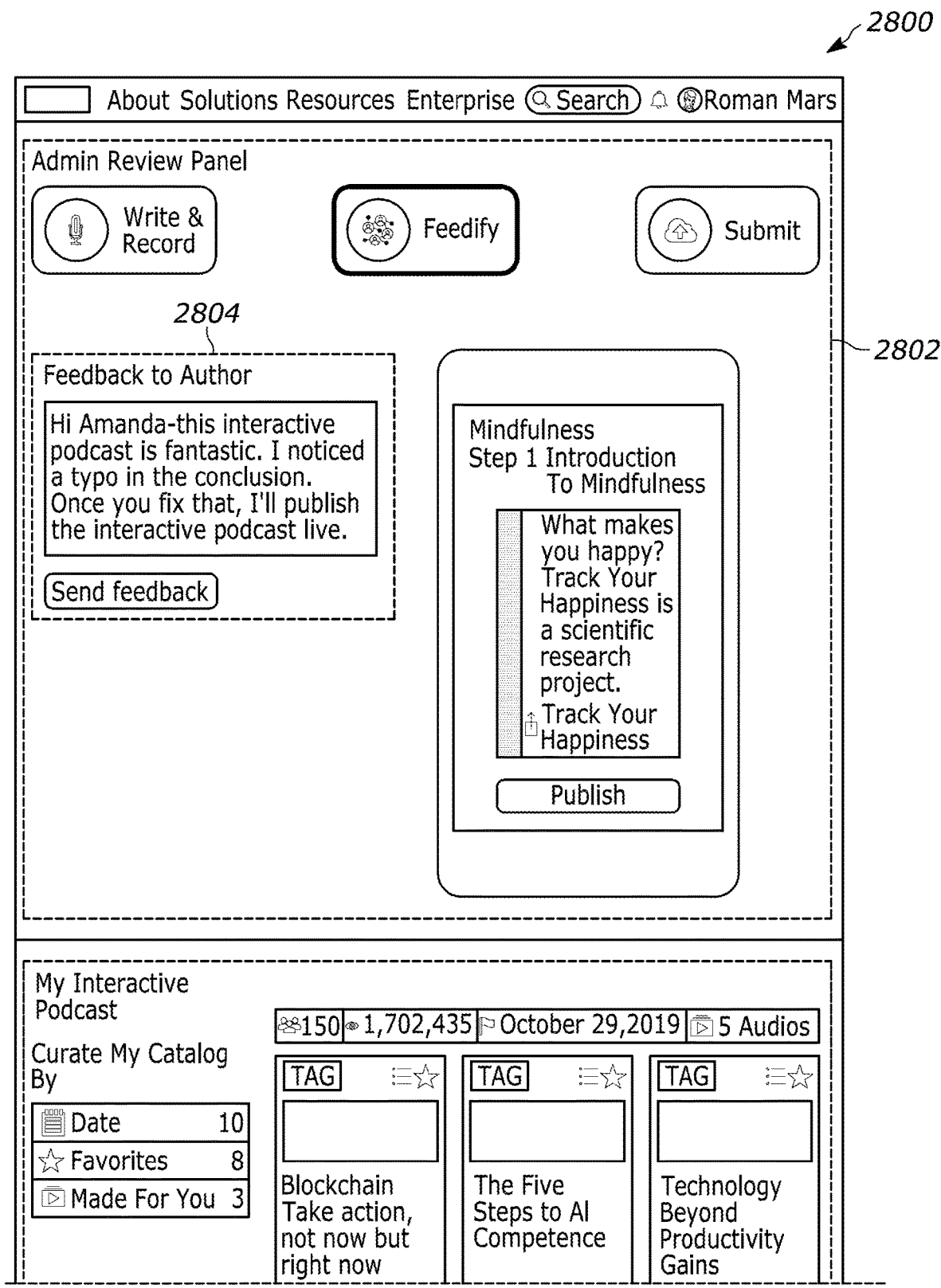
Figure 29:
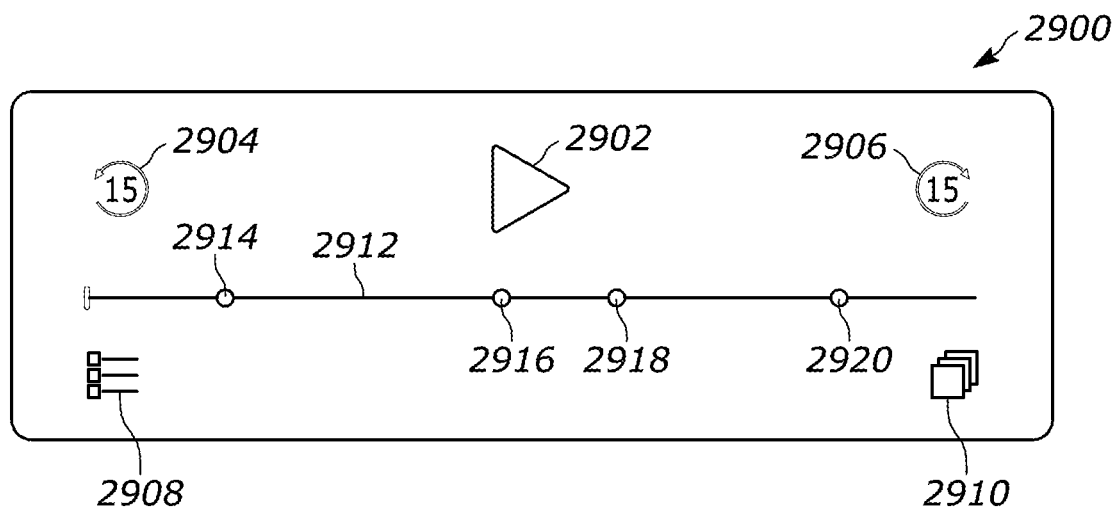
FIGS. 29-34 are images of an embedded web media player that is formed by a plurality of graphical user interfaces.

FIGS. 26-28 are images of graphic user interfaces 2600-2800 that illustrate an administrative review of various authored content. As illustrated in FIGS. 26 and 27, the graphical user interfaces 2600 and 2700 include a first authored content 2602 that was published as a product of graphical user interfaces 1600-2500. The graphical user interfaces 2600 and 2700 also includes a second authored content 2604 and a third authored content 2606. Additionally, as illustrated in FIG. 27, an edit menu 2702 of the graphical user interface 2700 may be used to delete, edit, or report the first authored content 2602. However, the edit menu 2702 may be also be selected with respect to the second authored content 2604 or the third authored content 2606.

As illustrated in FIG. 28, the graphical user interface 2800 includes an administrative review section 2802 that is similar to the content creation section 1502. The administrative review section 2802 is a means to provide administrative feedback to the author of the content that was published. For example, the administrative review section 2802 may be used to provide feedback regarding the first authored content 2602 that was published as a product of graphical user interfaces 1600-2500.

FIGS. 29-34 are images of an embedded web media player 2900 that is formed by a plurality of graphical user interfaces. The embedded web media player 2900 allows a listener to interact with the audio/visual content on a desktop or integrated within other systems located on the web. This embedded web media player 2900 includes all the same functionality as described above with respect to the mobile "app" including feed cards, activities, links, or other suitable contextually-related audio/visual content to interact with on the screen and link out to various "guided" suggestions from the author of the interactive podcast or generated by machine learning.

As illustrated in FIGS. 29-34, the embedded web media player 2900 provides a play/pause graphical user interface (GUI) element 2902, a rewind audio GUI element 2904, and a fast forward audio GUI element 2906, a chapter list GUI element 2908, and a chapter card GUI element 2910. Additionally, as illustrated in FIGS. 29-34, the embedded web media player 2900 also includes the synchronous additional audio/visual content that accompanies the audio of the podcast, with the ability to interact with the synchronous additional audio/visual content. In particular, the embedded web media player 2900 includes an audio timeline 2912 with a plurality of time stamps 2914-2920 that are linked to the synchronous additional audio/visual content that accompanies the audio of the podcast. In some examples, the embedded web media player 2900 may also provide a means to bookmark or share the synchronous additional audio/visual content.

Figure 30:
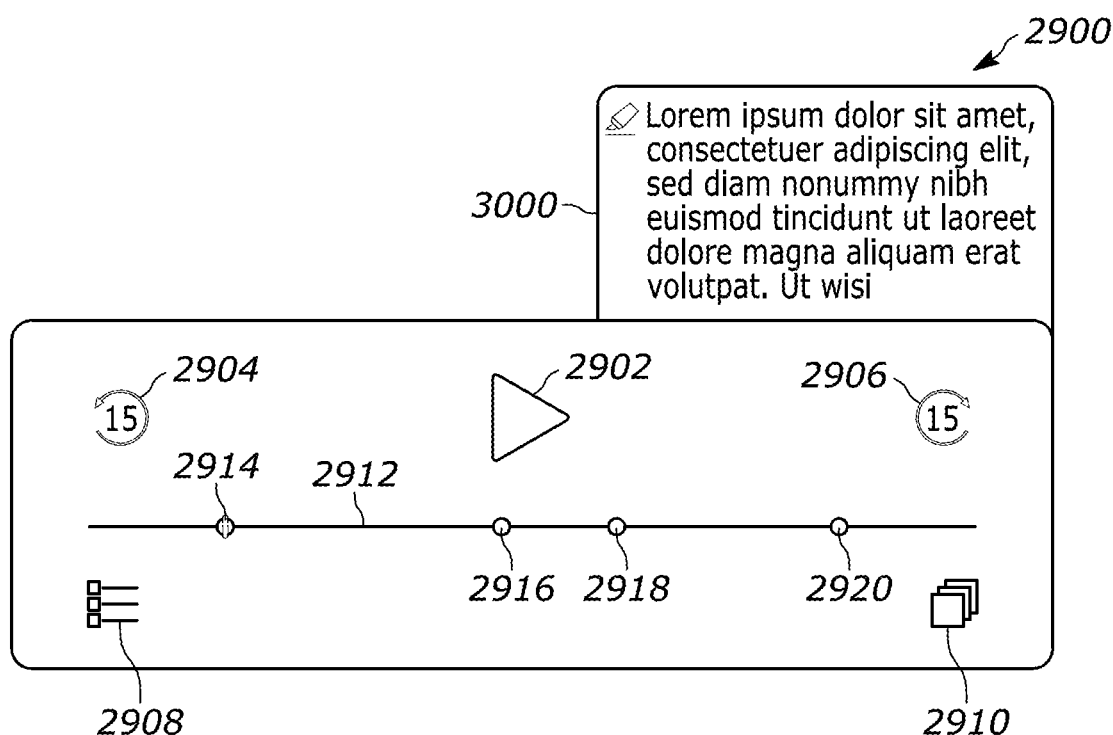

As illustrated in FIG. 30, upon reaching the first time stamp 2914, the embedded web media player 2900 changes from a first graphical user interface to a second graphical user interface that further includes a textual information GUI section 3000. In some examples, the textual information GUI section 3000 may be written text or some other suitable additional visual content that is related to the audio playback.

Figure 31:
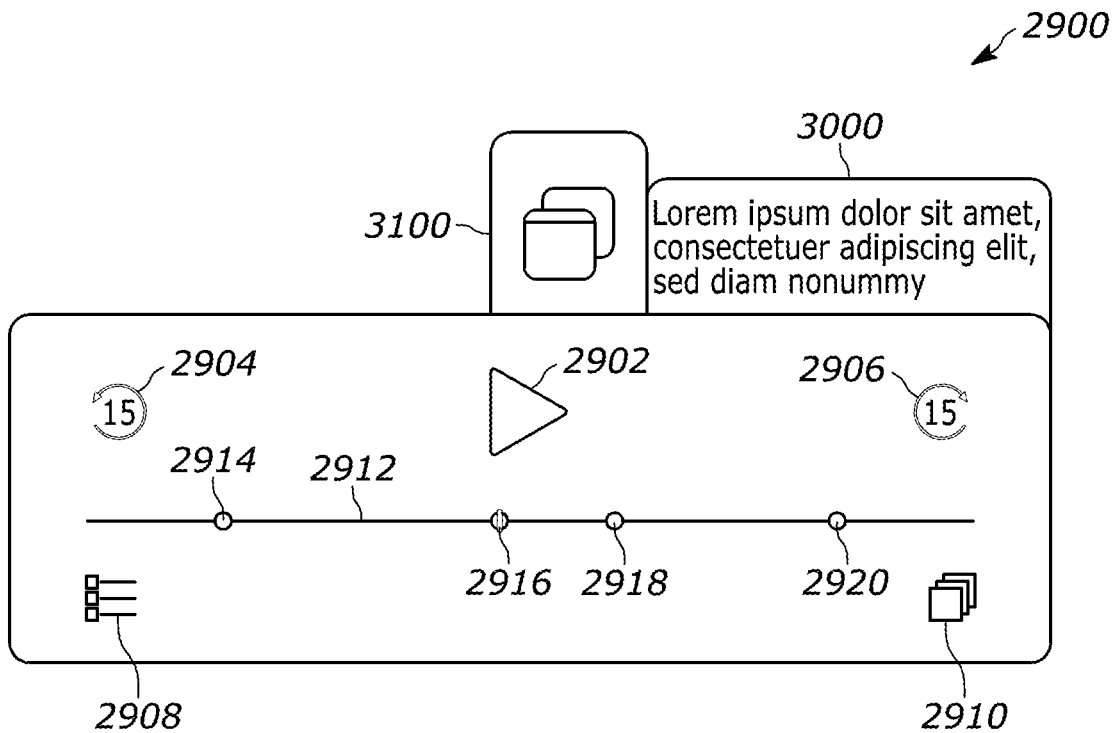

As illustrated in FIG. 31, upon reaching the second time stamp 2916, the embedded web media player 2900 changes from a first graphical user interface to a second graphical user interface that further includes the textual information GUI section 3000 and a link section 3100. In some examples, the link section 3100 may be a hyperlink to a webpage, an article, audio, video, or some other suitable additional audio/visual content that is related to the audio playback.

Figure 32:
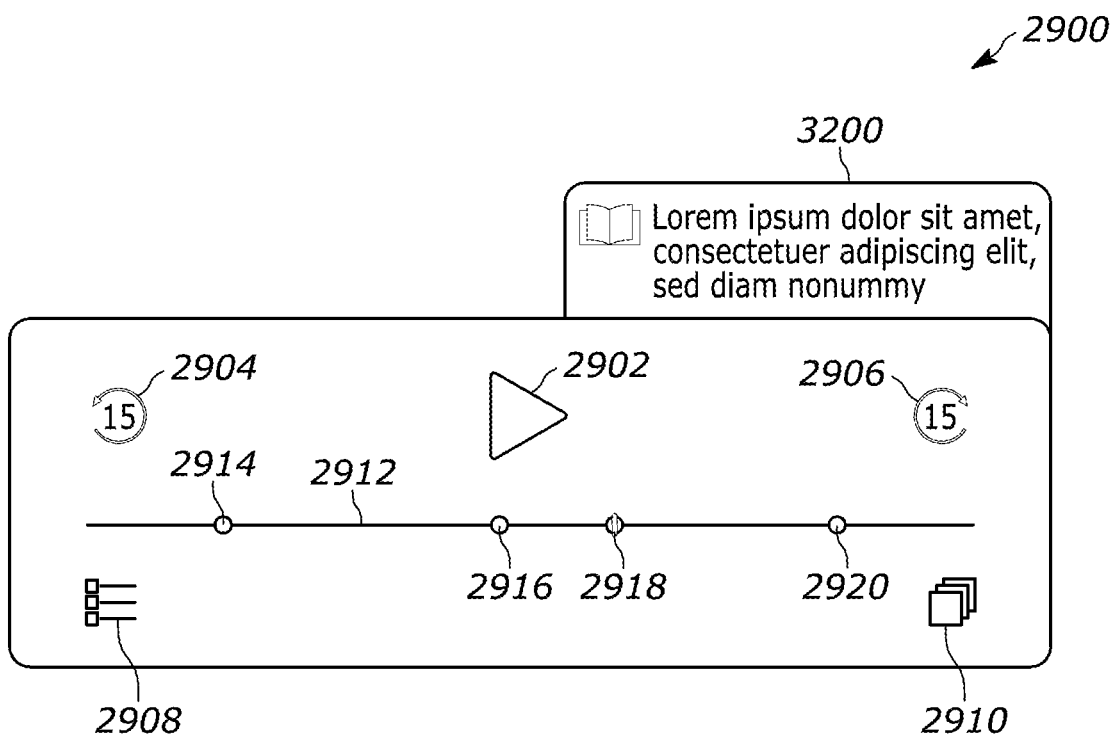

As illustrated in FIG. 32, upon reaching the third time stamp 2918, the embedded web media player 2900 changes to a third graphical user interface that further includes a second textual information GUI section 3200. In some examples, the second textual information GUI section 3200 may be a summary of a quote, an article, or some other suitable additional visual content that is related to the audio playback.

Figure 33:
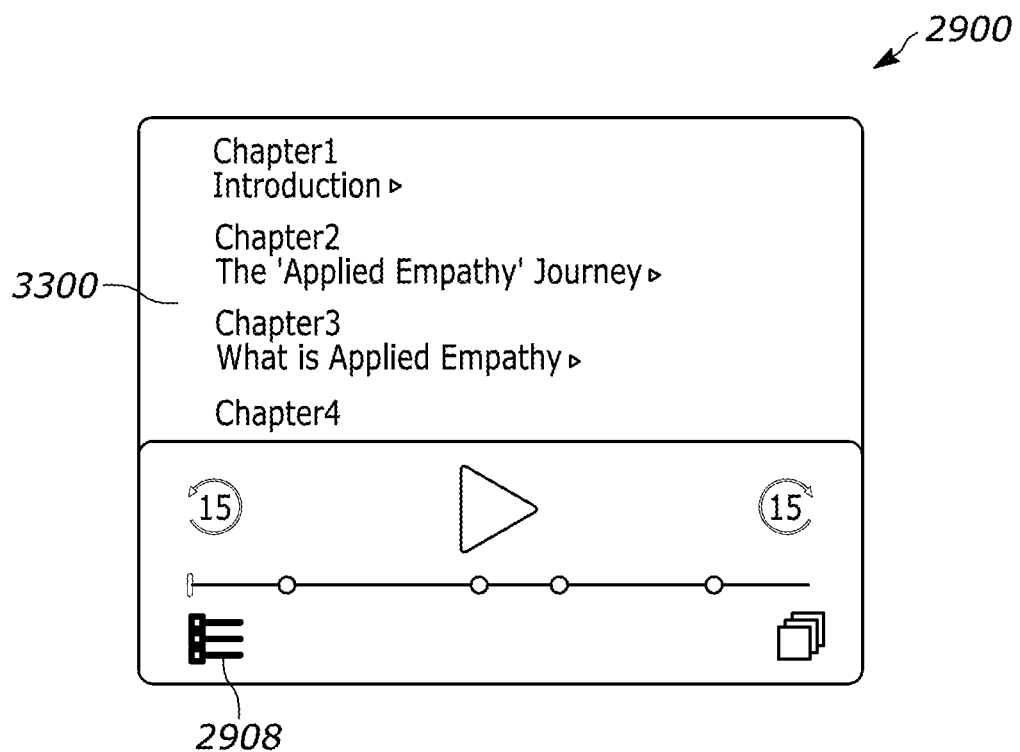

As illustrated in FIG. 33, upon selecting the chapter list GUI element 2908, the embedded web media player 2900 changes to a fourth graphical user interface that further includes a chapter list GUI section 3300. In some examples, the chapter list GUI section 3300 provides a list of segments in the interactive podcast.

Figure 34:
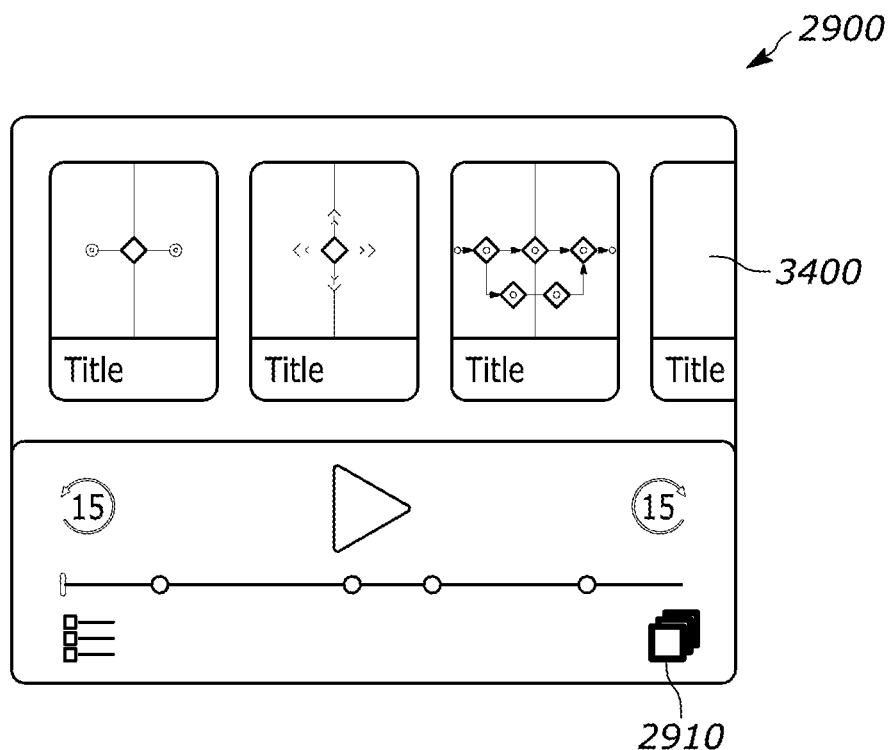

As illustrated in FIG. 34, upon selecting the chapter card GUI element 2910, the embedded web media player 2900 changes to a fifth graphical user interface that further includes a chapter card GUI section 3400. In some examples, the chapter card GUI section 3400 provides a list of segments in the interactive podcast in a visual card format.

The following are enumerated examples of the computing devices, non-transitory computer-readable media, and methods for authoring an interactive podcast. Example 1: A computing device comprising: an electronic processor; and a memory including an interactive podcast program that, when executed by the electronic processor, causes the electronic processor to perform a set of operations including retrieving, from a server, a podcast, one or more links to additional audio/visual content that is contextually related to the podcast, and metadata; and generating an interactive podcast by generating a plurality of graphical user interfaces based on the podcast, the one or more links to the additional audio/visual content, and the metadata, wherein the plurality of graphical user interfaces is configured to provide a user interaction interface between the podcast and the one or more links to the additional audio/visual content.

Example 2: The computing device of Example 1, wherein the metadata includes a first timestamp of the podcast that is associated with and contextually related to a first link of the one or more links to the additional audio/visual content.

Example 3: The computing device of Example 2, wherein the metadata includes a second timestamp of the podcast that is associated with and contextually related to a second link of the one or more links to the additional audio/visual content that is different from the first link.

Example 4: The computing device of Example 3, wherein the metadata includes a third timestamp of the podcast that is associated with and contextually related to a third link of the one or more links to the additional audio/visual content that is different from the first link and the second link.

Example 5: The computing device of Example 4, wherein the additional audio/visual content includes at least one content from a group consisting of: a third-party hyperlink, a third-party document, a third-party image, a third-party highlight, a third-party quote, a third-party audio, a third-party quiz, a third-party video, an author-created hyperlink, an author-created document, an author-created image, an author-created highlight, an author-created quote, an author-created audio, an author-created quiz, and an author-created video.

Example 6: The computing device of any of Examples 1-5, further comprising: a display screen, wherein the set of operations further includes controlling the display screen to display the interactive podcast.

Example 7: The computing device of any of Examples 1-5, wherein the set of operations further includes controlling a webpage to display the interactive podcast on a web browser.

Example 8: A non-transitory computer-readable medium storing instructions that, when executed by an electronic processor, cause the electronic processor to perform a set of operations, the set of operations comprising: retrieving, from a server, a podcast, one or more links to additional audio/visual content that is contextually related to the podcast, and metadata; and generating an interactive podcast by generating a plurality of graphical user interfaces based on the podcast, the one or more links to the additional audio/visual content, and the metadata, wherein the plurality of graphical user interfaces is configured to provide a user interaction interface between the podcast and the one or more links to the additional audio/visual content.

Example 9: The non-transitory computer-readable medium of Example 8, wherein the metadata includes a first timestamp of the podcast that is associated with and contextually related to a first link of the one or more links to the additional audio/visual content.

Example 10: The non-transitory computer-readable medium of Example 9, wherein the metadata includes a second timestamp of the podcast that is associated with and contextually related to a second link of the one or more links to the additional audio/visual content that is different from the first link.

Example 11: The non-transitory computer-readable medium of Example 10, wherein the metadata includes a third timestamp of the podcast that is associated with and contextually related to a third link of the one or more links to the additional audio/visual content that is different from the first link and the second link.

Example 12: The non-transitory computer-readable medium of Example 11, wherein the additional audio/visual content includes at least one content from a group consisting of: a third-party hyperlink, a third-party document, a third-party image, a third-party highlight, a third-party quote, a third-party audio, a third-party quiz, a third-party video, an author-created hyperlink, an author-created document, an author-created image, an author-created highlight, an author-created quote, an author-created audio, an author-created quiz, and an author-created video.

Example 13: The non-transitory computer-readable medium of any of Examples 8-12, further comprising: controlling a display screen of a smartphone to display the interactive podcast.

Example 14: The non-transitory computer-readable medium of any of Examples 8-12, further comprising: controlling a webpage to display the interactive podcast on a web browser.

Example 15: The non-transitory computer-readable medium of Example 14, wherein controlling the webpage to display the interactive podcast on the web browser further includes embedding a media player into the webpage, wherein the media player is configured to playback the audio, and change between the plurality of graphical user interfaces to playback the additional audio/visual content in combination with the playback of the audio.

Example 16: A method for authoring an interactive podcast, the method comprising: recording, with an electronic processor, audio; converting, with the electronic processor, the audio into textual information; dividing, with the electronic processor, the audio into segments; creating, with the electronic processor, an interactive podcast by uploading additional material that is then linked to one or more timestamps in the audio; and uploading, with the electronic processor, the interactive podcast to a server.

Example 17: The method of Example 16, further comprising: receiving, with the electronic processor, an input of second textual information that is in addition the textual information that is converted from the audio, wherein the audio and the second textual information are divided into the segments.

Example 18: The method of Examples 16 or 17, wherein creating, with the electronic processor, an interactive podcast by uploading additional material that is then linked to one or more timestamps in the audio further includes uploading a first piece of material that is then linked to a first time stamp in the audio; and uploading a second piece of material that is then linked to a second time stamp in the audio, wherein the second piece of material is different from the first piece of material, and wherein the second time stamp is different from the first time stamp.

Example 19: The method of Example 18, wherein the first piece of material includes at least one from a first group consisting of: a third-party hyperlink, a third-party document, a third-party image, a third-party highlight, a third-party quote, a third-party audio, a third-party quiz, a third-party video, an author-created hyperlink, an author-created document, an author-created image, an author-created highlight, an author-created quote, an author-created audio, an author-created quiz, and an author-created video.

Example 20: The method of Example 18, wherein the second piece of material includes at least one from a second group consisting of: a third-party hyperlink, a third-party document, a third-party image, a third-party highlight, a third-party quote, a third-party audio, a third-party quiz, a third-party video, an author-created hyperlink, an author-created document, an author-created image, an author-created highlight, an author-created quote, an author-created audio, an author-created quiz, and an author-created video.

Thus, the present disclosure provides, among other things, an interactive podcast with integrated additional audio/visual content. Various features and advantages of the invention are set forth in the following claims.

What is claimed is:

1. A method for creating an interactive podcast comprising:
    providing, with an electronic processor, a title text field;
    receiving, with the electronic processor, title information in the title text field for the interactive podcast;
    providing, with the electronic processor, a chapter text field;
    receiving, with the electronic processor, chapter information in the chapter text field for the interactive podcast;
    providing, with the electronic processor, a first content field;
    receiving, with the electronic processor, textual content in the first content field for the interactive podcast;
    providing, with the electronic processor, a second content field;
    recording, with the electronic processor, audio for the second content field for the interactive podcast, the audio being based on the textual content;
    converting, with the electronic processor, the audio into textual information;
    uploading, with the electronic processor, additional material;
    selecting, with the electronic processor, a selected text within the textual information;
    providing, with the electronic processor, an additional content interface for the additional material;
    linking, with the electronic processor, the additional material to the selected text;
    providing, with the electronic processor, an author information section;
    receiving, with the electronic processor, author information for an author of the audio in the author information section;
    generating, with the electronic processor, the interactive podcast including the audio, the textual information and the additional material, wherein the additional material is linked to the selected text within the textual information; and
    uploading, with the electronic processor, the interactive podcast to a server.

2. The method of claim 1, wherein:
    the audio and the textual content are divided into segments.

3. The method of claim 1, wherein the additional material includes at least one from a group consisting of:
    a third-party hyperlink,
    a third-party document,
    a third-party image,
    a third-party highlight,
    a third-party quote,
    a third-party audio,
    a third-party quiz,
    a third-party video,
    an author-created hyperlink,
    an author-created document,
    an author-created image,
    an author-created highlight,
    an author-created quote,
    an author-created audio,
    an author-created quiz, and
    an author-created video.

* * * * *